(12) United States Patent
Fung et al.

(10) Patent No.: US 10,296,684 B2
(45) Date of Patent: May 21, 2019

(54) PARALLEL RESERVOIR SIMULATION WITH ACCELERATED AQUIFER CALCULATION

(71) Applicant: Saudi Arabian Oil Company, Dhahran (SA)

(72) Inventors: Larry Siu-Kuen Fung, Dhahran (SA); Shouhong Du, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 230 days.

(21) Appl. No.: 15/352,803

(22) Filed: Nov. 16, 2016

(65) Prior Publication Data

US 2018/0137223 A1    May 17, 2018

(51) Int. Cl.
| | | |
|---|---|---|
| G06F 17/50 | (2006.01) |
| E21B 41/00 | (2006.01) |
| E21B 43/16 | (2006.01) |
| G01V 11/00 | (2006.01) |
| G01V 99/00 | (2009.01) |

(52) U.S. Cl.
CPC ...... *G06F 17/5018* (2013.01); *E21B 41/0092* (2013.01); *E21B 43/16* (2013.01); *G01V 11/005* (2013.01); *G01V 99/005* (2013.01); *G06F 2217/16* (2013.01)

(58) Field of Classification Search
None
See application file for complete search history.

(56) References Cited

U.S. PATENT DOCUMENTS

| | | | | |
|---|---|---|---|---|
| 2012/0296619 A1* | 11/2012 | Maliassov | ............... | E21B 43/00 703/10 |
| 2014/0236559 A1* | 8/2014 | Fung | ...................... | E21B 41/00 703/10 |

OTHER PUBLICATIONS

The International Search Report and Written Opinion for related PCT application PCT/US2017/060458 dated Feb. 5, 2018.
Li, D., et al. "Optimal Uplayering for Scaleup of Multimillion-Cell Geologic Models," SPE 62927, Oct. 1-4, 2000 SPE Annual Technical Conference and Exhibition; Dallas, TX, pp. 1-16.
Coats, K. Reservoir Simulation. Petroleum Engineering Handbook; Chapter 48; 1987; pp. 1-20.
Carter, R.D. and Tracy, G.W. 1960.: "An Improved Method for Calculating Water Influx", Trans., AIME, 219: 415-417.

(Continued)

*Primary Examiner* — Suzanne Lo
(74) *Attorney, Agent, or Firm* — Bracewell LLP; Constance G. Rhebergen; Albert B. Kimball, Jr.

(57) ABSTRACT

Reservoir simulation for simulation models which include a large edge aquifer region is provided with a speed up in processing reducing computer processing time. Connected aquifer grid cells in a vertical column are amalgamated to reduce the total number of active cells in the solution phase. The fine grid property data is maintained for computing distributed 3D graph, and connection factors (transmissibilities), as well as pore volume and compressibility calculation of coarsened aquifer cells during nonlinear solution phase. Since the work load in the solution phase is proportional to the total number of active cells, a significant speedup in simulation time is provided. The aquifer fine grid pressures are computed using vertical equilibrium treatment of hydraulic potential inside an amalgamated aquifer coarse cell.

5 Claims, 18 Drawing Sheets

(56) References Cited

OTHER PUBLICATIONS

Fetkovich, MJ,: "A Simplified Approach to Water Influx Calculations-Finite Aquifer Systems", J. Pet Tech 23 (7): 814-28, SPE-2603-PA. doi:10.2118/2603-PA, 1971.
Hurst, W.: "The Simplification of the Material Balance Formulas by the Laplace Transformation", Trans. AIME, 213:292-303, 1958.
Leung, W.F., "A Fast Convolution Method for Implementing Single-Porosity Finite/Infinite Aquifer Models for Water-Influx Calculations", SPE Res Eng 1(5): 490-510; Trans., AIME, 281. SPE-12276-PA. 1986.

\* cited by examiner

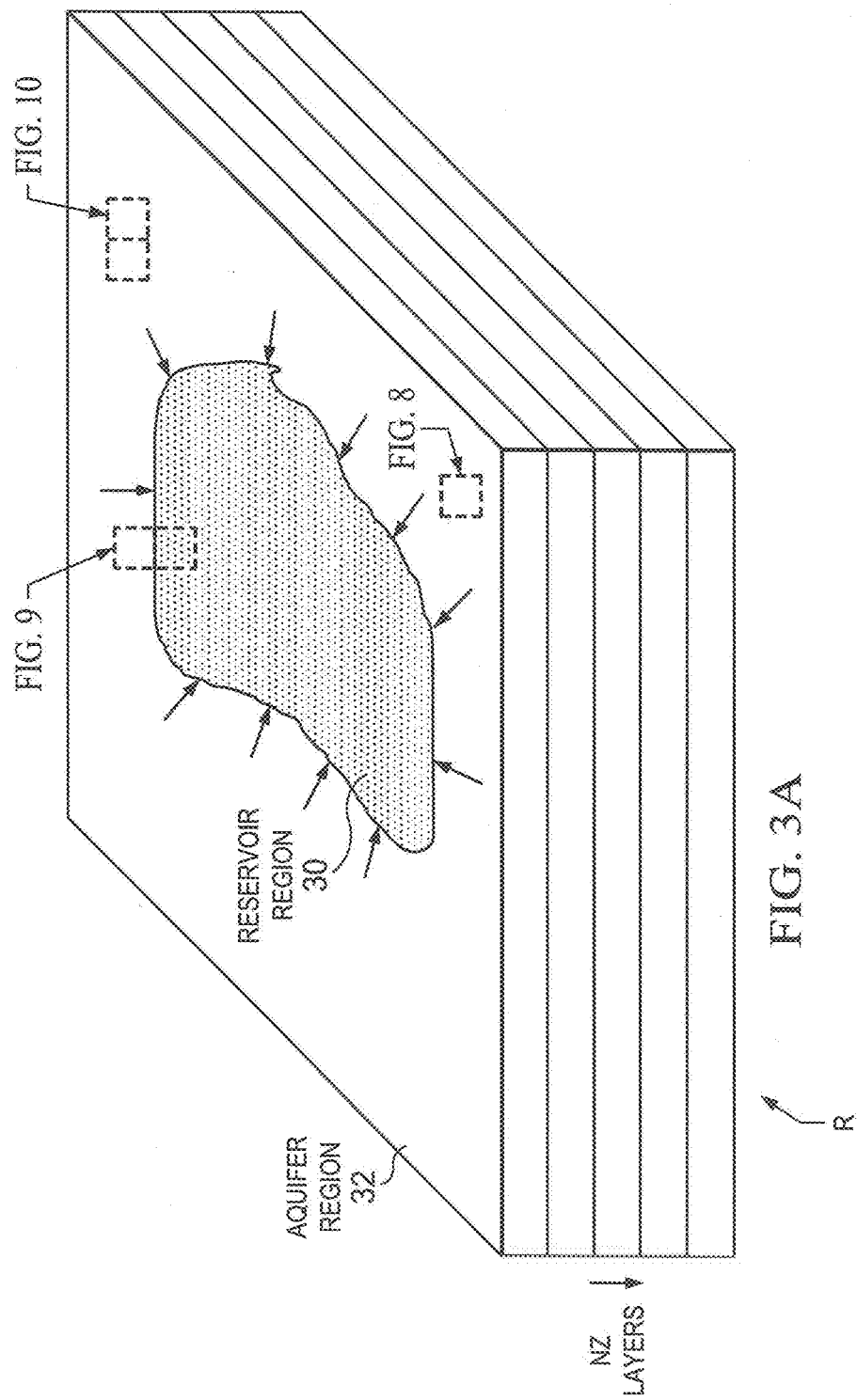

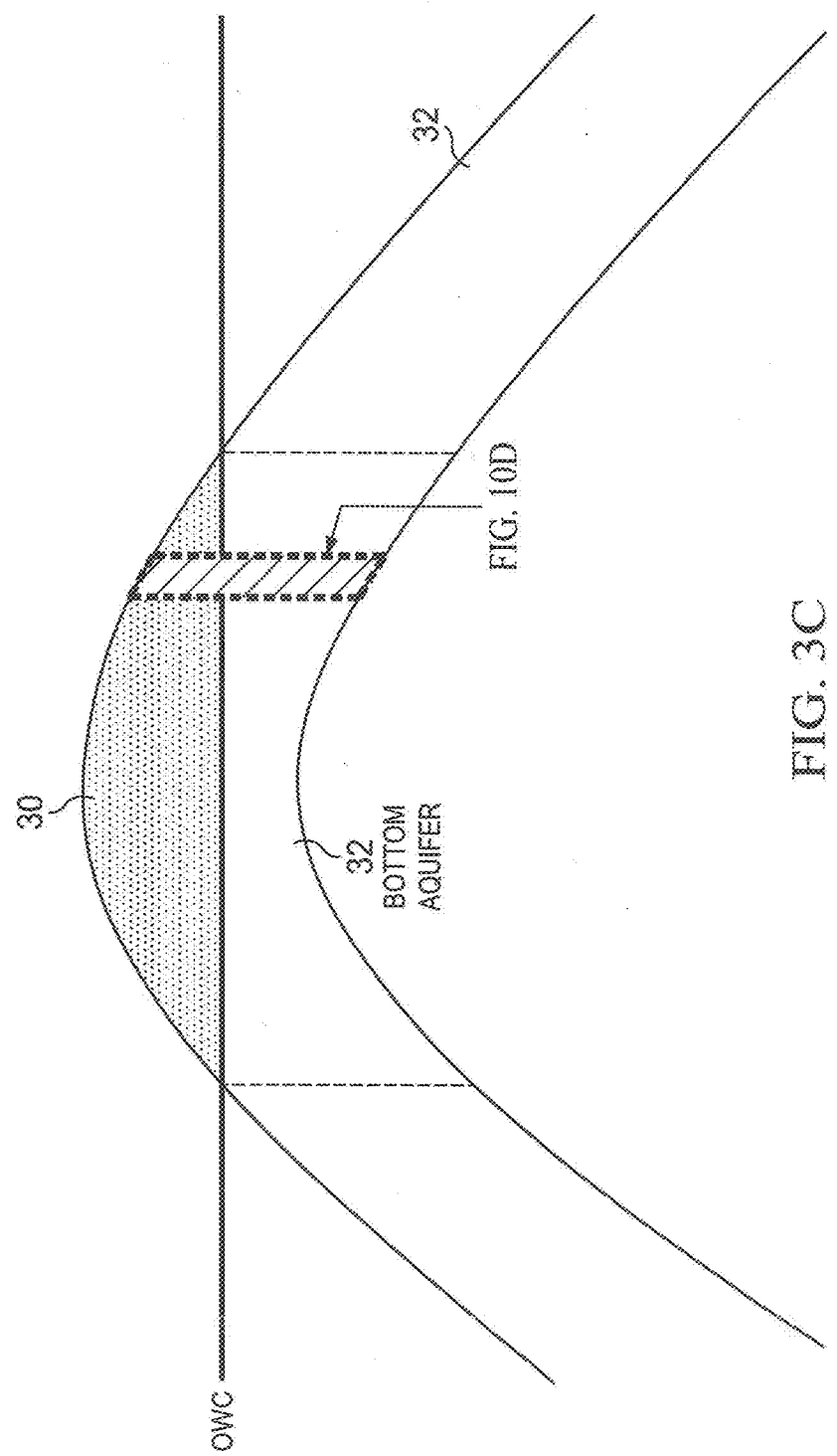

PARALLEL RESERVOIR SIMULATION WITH ACCELERATED AQUIFER CALCULATION

BACKGROUND OF THE INVENTION

1. Field of the Invention

The present invention relates to computerized simulation of hydrocarbon reservoirs, and more particularly to parallel reservoir simulation with accelerated aquifer calculation for a hydrocarbon reservoir surrounded by peripheral aquifer.

2. Description of the Related Art

For many current reservoir simulation models, there is generally a large portion of grids being aquifer cells. Computational resources are required to be spent to solve for the grids in the aquifer. Reservoir simulation at present, so far as is known, has treated the aquifer grid cells in the same way as the hydrocarbon bearing grid cells in the reservoir. Aquifer grid coarsening has been used in some cases to save computation time.

Current art reservoir simulation practice treats the grid cells in aquifer regions of the model in the same way as the hydrocarbon bearing regions. This is necessary as hydrocarbon can be inadvertently pushed into the aquifer and needs to be modeled. At the same time, the transient water influx over the boundary of the reservoir can be a significant recovery mechanism. The strength of the water influx from the aquifer can be highly variable over the reservoir perimeter due to heterogeneity, structure, barriers, fractures, etc. which may reside locally. For models which include large aquifer regions, a significant fraction of the computational expense can be in the modeling of the water movement in the aquifer.

This has amounted to upscaling several fine cells into a coarse cell with homogenized storage terms and flow properties for the coarsened grid. This has led to reduced grid resolution. Generally, the simulation results are affected and differ from the original fine grid model. The current coarsening methods typically change the simulation results to some degrees. The more aggressive the coarsening, the poorer the match would be comparing to the original model.

Grid coarsening methods were applied to areas of a reservoir model where lower resolution was considered sufficient. Grid coarsening blends several fine grid cells into a coarse grid cell in order to achieve faster simulation. During grid coarsening, fine-grid properties were homogenized to the coarse grid.

Another prior-art technique, which was usually even more inaccurate, has been to trim the aquifer cells and replace them with an analytic aquifer model. Analytical solution can only have single geometry (usually 1D horizontal or vertical), constant property, simple boundary conditions. This approach is too inaccurate and inappropriate in modern simulation practice whenever model data is available.

Historically, simulation engineers had used analytical model to compute water influx into the reservoir. One such method is described by Carter and Tracy "An Improved Method for Calculating Water Influx", Trans., AIME, v. 219: p. 415-417, (1960). Such an analytical model assumed 1D aquifer geometry, and an infinite acting and homogeneous medium property. This method should only be used when the aquifer property and geometry is not known or unavailable. For modern reservoir simulation, this analytical model is too inaccurate to correctly represent the variable strength of the aquifer across the reservoir boundaries. This is particularly true for large reservoir or oil field with significant active aquifers at the boundaries.

When a geological description is available, it is highly desirable to keep the aquifer description intact such that the effects of transient water influx can be modeled correctly and the model history match updating process can be applied. Therefore, analytical models should only apply at the outer boundaries of the model beyond which there is no data, and an empirical treatment using analytical model may be acceptable in this case.

Other techniques have, so far as is known used analytical methods to represent water influx from aquifer which are restricted to very simple geometry, dimensionality, boundary conditions, and constant property description of the aquifer. As an adjunct to a detailed numeral simulation model, these were empirical history matching method as empirical boundary conditions on the numerical model, beyond which there are no geological description for more precise treatments.

As mentioned, analytical methods were typically one dimensional, either horizontal or vertical, with uniform medium property, infinite acting outer boundary conditions. The analytical methods did not have a general three dimensional or 3D structure with heterogeneous property description. Thus, they should only be used when there are no data about the aquifer. The analytical models of this type were applied to the extremities of a simulation model to represent an aquifer area not covered by the simulation model.

SUMMARY OF THE INVENTION

Briefly, the present invention provides a new and improved machine to simulate reservoir simulation measures of a subsurface reservoir having a hydrocarbon regions and a peripheral aquifer region, the reservoir being defined by a plurality of grid cells designated organized as hydrocarbon grid cells for the hydrocarbon region of the reservoir and aquifer grid cells for the peripheral aquifer region, the plurality of grids cells being partitioned into a plurality of processing sub-domains, each processing sub-domain containing at least a portion of the plurality of grid cells. The machine takes the form of a plurality of processor nodes having one or more processors, with the plurality of processor nodes being assigned to processing sub-domains. The processing sub-domains into which the processor nodes are organized include a parallel input processing grid sub-domain, with the processor nodes in the parallel input processing domain organizing the grid cells of the reservoir into input blocks of cell data for processing. The processing sub-domains also include an unstructured graph and connection factor sub-domain, with the processor nodes in the unstructured graph and connection factor sub-domain forming cell geometries for amalgamating aquifer grid cells and defining active grid cells composed of the hydrocarbon grid cells, forming a load-balanced processing network. The processing subdomains also include a simulation processing sub-domain for performing reservoir simulation of the active grid cells.

The present invention also provides a new and improved computer implemented method of simulating reservoir simulation measures in the cells of a reservoir in a computerized reservoir simulation of a subsurface reservoir. The reservoir has a hydrocarbon region and an aquifer region peripheral to the hydrocarbon region. The computerized reservoir simulation is performed in a processor having plurality of computer nodes, each comprising a plurality of computer cores operating in parallel. The reservoir is defined by a reservoir model composed of a plurality of grid cells. The computer implemented method of simulating pressure in the cells of the reservoir according to the present invention determines the presence of vertical columns of cells of the aquifer region, and groups the vertical columns of cells of the aquifer region into connected grid blocks of amalgamated aquifer cells. Load balanced domain partitioning of the cells of the hydrocarbon region and the amalgamated aquifer cells of the aquifer region is performed, and transmissibilities between the cells of the amalgamated aquifer cells of the aquifer region are generated. The reservoir simulation of the cells of the hydrocarbon region is performed to determine pressures within the grid cells of the cells of the hydrocarbon region, and the aquifer region, and pore volumes and porosities of the amalgamated aquifer cells are determined based on the determined pressures determined during the reservoir simulation. Simulation processing continues until it has been determined that convergence has occurred for the reservoir simulation, at which time the amalgamated aquifer cells are populated with the determined pressures and pore volumes for the aquifer cells.

The present invention also provides a new and improved data processing system for computerized reservoir simulation of reservoir simulation measures in a subsurface reservoir having a hydrocarbon region and an aquifer region peripheral to the hydrocarbon region, the reservoir being defined by a reservoir model composed of a plurality of grid cells, the data processing system includes a processor having a plurality of computer nodes, each of the computer nodes comprising a plurality of computer cores operating in parallel. The computer nodes determine the presence of vertical columns of cells of the aquifer region, and group the vertical columns of cells of the aquifer region into connected grid blocks of amalgamated aquifer cells. The computer nodes perform load balanced domain partitioning of the cells of the hydrocarbon region and the amalgamated aquifer cells of the aquifer region, and generate transmissibilities between the cells of the amalgamated aquifer cells of the aquifer region. The computer nodes also perform the reservoir simulation of the cells of the hydrocarbon region to determine pressures within the grid cells of the cells of the hydrocarbon region and the aquifer region and determine pore volumes and porosities of the amalgamated aquifer cells based on the determined pressures determined during the reservoir simulation. The computer nodes also determine if convergence has occurred for the reservoir simulation and, if so, populate the amalgamated aquifer cells with the determined pressures and pore volumes for the aquifer cells.

The present invention also provides a new and improved data storage device having stored in a non-transitory computer readable medium computer operable instructions for causing a processor to perform computerized reservoir simulation of a subsurface reservoir having a hydrocarbon region and an aquifer region peripheral to the hydrocarbon region. The computerized reservoir simulation is performed in a processor which has a plurality of computer nodes, each comprising a plurality of computer cores operating in parallel. The reservoir is defined by a reservoir model composed of a plurality of grid cells. The stored instructions cause simulation of pressure in the cells of the reservoir. The instructions stored in the data storage device cause the processor to determine the presence of vertical columns of cells of the aquifer region, and group the vertical columns of cells of the aquifer region into connected grid blocks of amalgamated aquifer cells. The instructions then cause load balanced domain partitioning of the cells of the hydrocarbon region and the amalgamated aquifer cells of the aquifer region, and generation of transmissibilities between the cells of the amalgamated aquifer cells of the aquifer region. The reservoir simulation of the cells of the hydrocarbon region is performed under control of the stored instructions to determine pressures within the grid cells of the cells of the hydrocarbon region, and pore volumes and porosities of the amalgamated aquifer cells are determined based on the determined pressures determined during the reservoir simulation. Simulation processing according to the stored instructions continues until it has been determined that convergence has occurred for the reservoir simulation, at which time the amalgamated aquifer cells are populated with the determined pressures and pore volumes for the aquifer cells.

BRIEF DESCRIPTION OF THE DRAWINGS

FIG. 3A is a schematic diagram of a reservoir simulation model.

FIG. 3C is a vertical cross-sectional view taken along the line A-B of the reservoir model of FIG. 3B.

DETAILED DESCRIPTION OF THE PREFERRED EMBODIMENTS

For the recovery of oil and gas from subterranean reservoirs, wellbores are drilled into these formations for the recovery of hydrocarbon fluid. During the recovery process, fluids such as water and/or gas are injected into the injector wells and the fluid mixture in the pore space is produced from the producer wells. In order to predict the future performance of these reservoirs and to evaluate alternative development plans, reservoir simulators are used to run simulation models.

According to the present invention, time required for reservoir simulators to produce models of simulated reservoir production measures of interest is reduced. The reservoir production measures indicate reservoir behavior in the form of simulated reservoir fluid pressures and flows. Example of reservoir pressure, reservoir production measures, transmissibilities, fluid produced rate, oil rate, water rate, water cut and average pressure. These models are first calibrated with a history matching step using existing production data. The calibrated models are then used to evaluate future operation scenarios. For example, the history-matched models may be used to determine when and where to drill additional wells in order to recover more of the remaining hydrocarbon in place.

For many current reservoir simulation models, there is generally a large portion of grids being aquifer cells. Computational resources for reservoir simulation models with large numbers of aquifer cells have in the past thus been spent to solve for the grids in the aquifer. The present invention provides a new methodology based on underlying physics to significantly speed up the computation without a loss of accuracy. The present invention applies vertical aggregation of aquifer cells and applies equilibrium calculation to recover the pressure solution in the original fine cells. The present invention reduces the computation time while providing highly accurate results as compared to prior-art methods.

Figure 1:
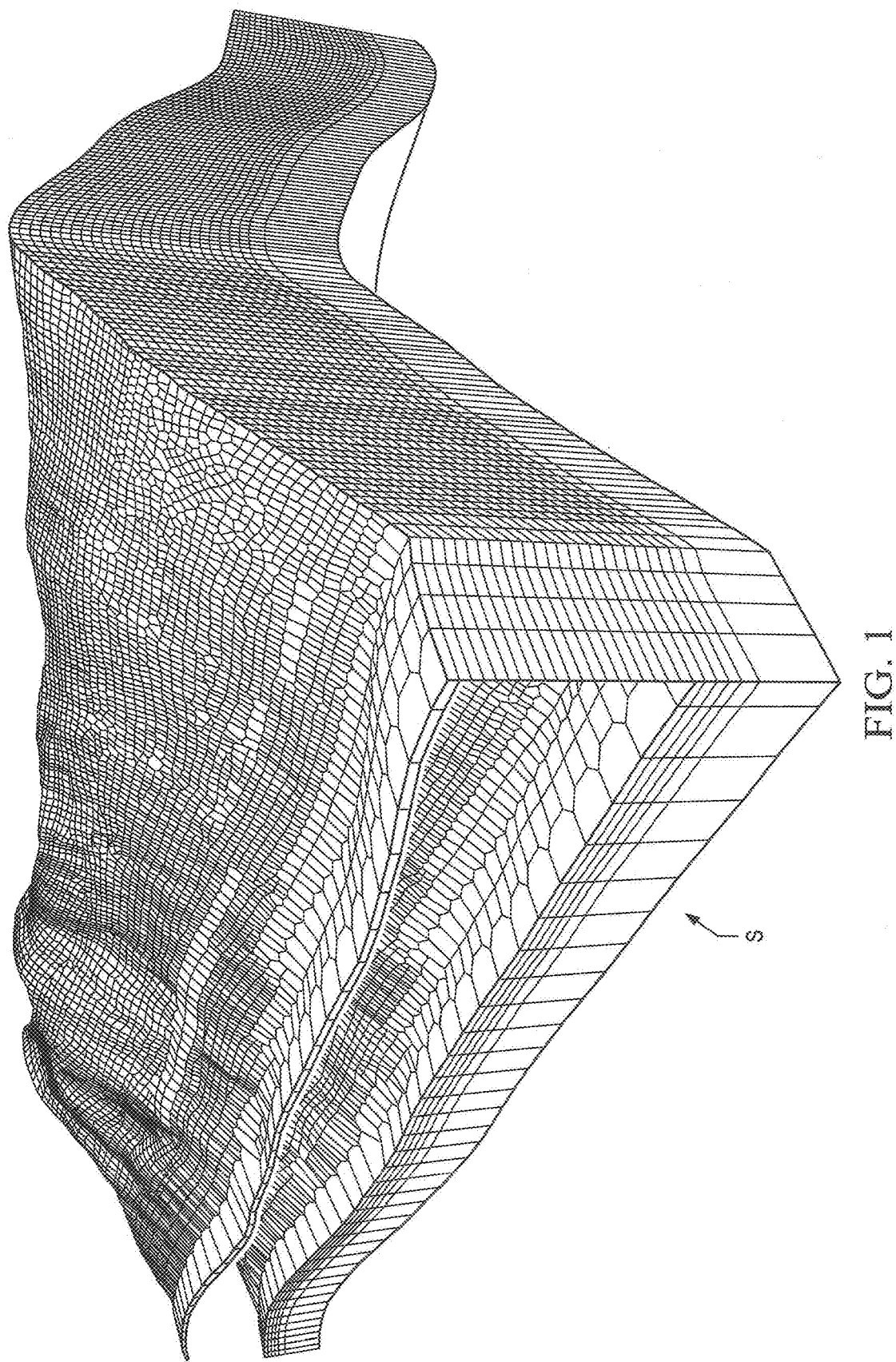
FIG. 1 is an isometric view of a computerized model of a subsurface reservoir structured grids.

The reservoir simulator is a computer-implemented software code which solves a system of discrete balance equations for each grid block. The discrete equations are typically formed from a finite-volume discretization of the governing system of non-nonlinear partial differential equations describing the mass, momentum, and energy conservation equations within the reservoir. FIG. 1 is an isometric view of a computerized model of a subsurface reservoir structured grids of a typical reservoir simulation domain S discretized into millions of finite volumes.

Nomenclature

In the following description, symbols are utilized which have the following meanings:

p=pressure
q=production rate
$x_i$=Mole fraction
Vj=Phase Volume
Sj=Phase Saturation
$c_i$=Overall Concentration of species i
Φ=porosity
ρ=density
μ=viscosity
ω=mass fraction
R=Homogeneous reaction rate
D=Dispersion Coefficient
u=velocity
$V_\Phi$=Rock pore volume
$n_i^t$=Overall number of mole

Superscripts ref=reference
p=a fluid phase
t=total

Subscripts i=component index
j=phase index

An example reservoir simulator is a GigaPOWERS reservoir simulator, for which a description can be found in Dogru, et al. (SPE119272, "A Next-Generation Parallel Reservoir Simulator for Giant Reservoirs," Proceedings of the SPE Reservoir Simulation Symposium, The Woodlands, Tex., USA, 2-4 Feb. 2009, 29 pp.) The transient solution of the multiphase multicomponent system involves the evolution of mass and energy conservation in a sequence of time steps from the initial condition of the reservoir. For each time step, the system of nonlinear discrete equations for each finite volume is linearized using what is known as the generalized Newton's method.

A general species conservation equation for the component i in a cell of a reservoir simulator is given by:

$$\frac{\partial c_i}{\partial t} + \nabla \cdot \sum_{j=1}^{n_o} \left( \rho_j \omega_{ij} u_j - \phi \rho_j S_j \vec{D}_{ij} \cdot \nabla \omega_{ij} \right) = \phi \sum_{j=1}^{n_o} (S_j R_{ij}) + (1-\phi) R_{iz} + q_i \quad (1)$$

wherein:

$$c_i = \phi \sum_{j=1}^{n_p} \rho_j \omega_{ij} S_j + (1-\phi) \rho_x \omega_{ix} \quad (2)$$

If dispersion, chemical reaction and absorption are ignored, the species equation simplifies to:

$$\frac{1}{V_b} \frac{\partial n_i^t}{\partial t} + \nabla \cdot \sum_{j=1}^{n_p} (\rho_j x_{ij} u_j) = q_i \quad (3)$$

since the pore space of porous medium must be filled with fluids present, the pore volume must be equal to the total fluid volume. This can be expressed as:

$$\sum_{i=1}^{n_p} V_j = V_\Phi \quad (4)$$

where the pore volume, $V_\Phi$, is a function of pressure alone and described as:

$$V_\Phi = V_\Phi^{ref} e^{C_r(P_{ref}-P)} \quad (5)$$

Pressure and the overall number of moles are the primary variables. For closure, the other equations used are constraints, as given below:

Constraints on Mole Fractions for Each Phase:

$$\sum_{i=1}^{n_o} x_{ij} = 1 \quad (6)$$

Constraints on Total Moles Per Component:

$$\sum_{j=1}^{n_o} n_j^p x_{ij} = n^t \quad (7)$$

Constraints on Fluid Saturations:

$$\sum_{i=1}^{n_p} S_j = 1 \quad (8)$$

wherein:

$$S_j = \frac{V_j}{\sum_{J=1}^{n_p} V_j} \quad (9)$$

$$V_j = \frac{n_j^p}{\rho_j} \quad (10)$$

Phase Velocities are Described by Darcy's Law:

$$u_j = -K\lambda_j(\nabla P_j - \gamma_j \nabla D) \quad (11)$$

Here K is the Permeability Tensor Defined as:

$$K = \begin{bmatrix} k_{xx} & k_{xy} & k_{xz} \\ k_{yx} & k_{yy} & k_{yz} \\ k_{zx} & k_{zy} & k_{zz} \end{bmatrix} \quad (12)$$

Generally, full-field simulation models include regions of aquifer cells. This is particular important if the peripheral and/or bottom aquifers are active and provide significant on-going reservoir pressure support for the hydrocarbon recovery operation.

Figure 2:
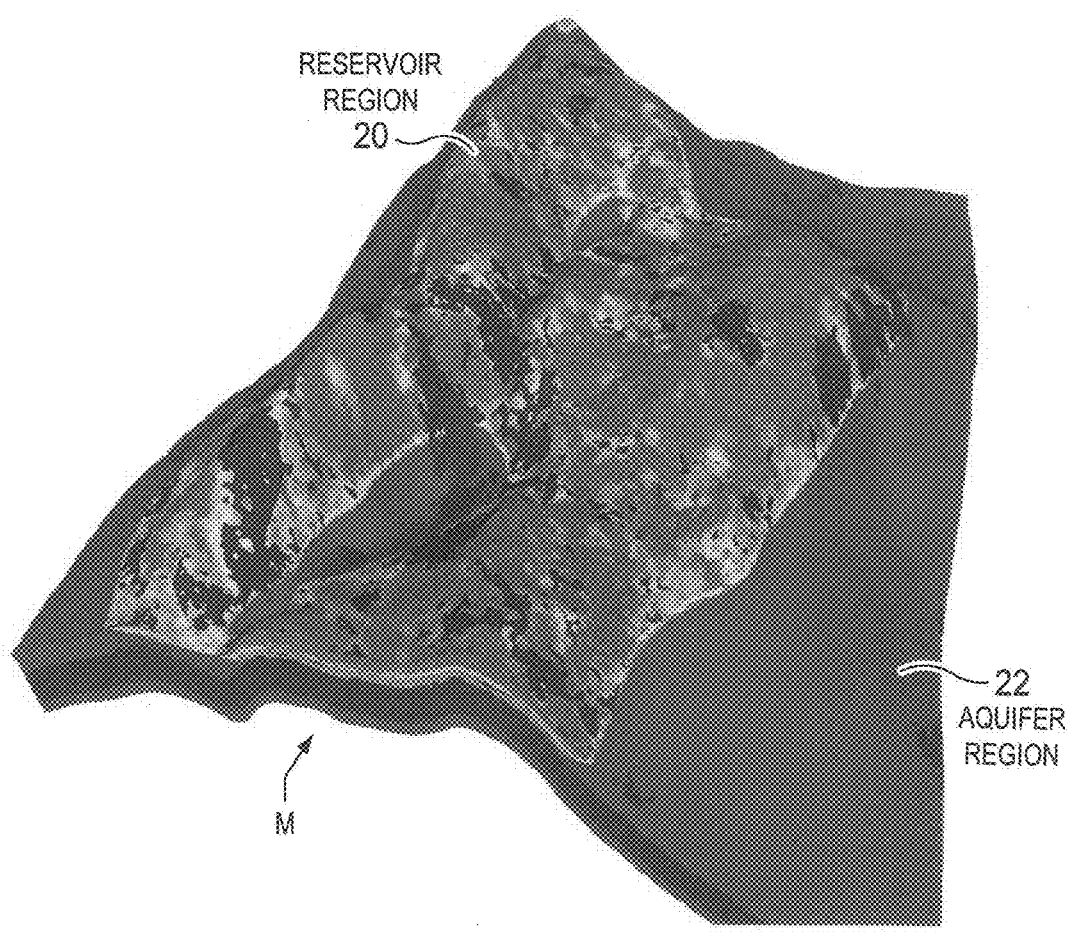
FIG. 2 is an isometric view of a simulation model indicating a hydrocarbon reservoir region surrounded by peripheral aquifer region.

FIG. 2 illustrates schematically a typical full-field simulation model M with a reservoir region 20 and a surrounding aquifer region 22. The geology and structure of the aquifer region 22 is as complex as the reservoir itself and the transient peripheral water influx may be strongly influenced by these local features, leading to variable water front movements across the reservoir boundaries. Accordingly, the correct modeling of water front movement is an important aspect of the full-field reservoir simulation. Experience indicates that simulation models typically may contain from 30% to upward of 80% of aquifer grid cells. In multi-reservoir full-field models, the pressure response in inter-reservoir region of the aquifer can be important to correctly model the interference of production operations in near-by areas.

The present invention provides a methodology of vertical amalgamation method for connected grid cells organized into a simulation domain such as shown at S in FIG. 1. The methodology of the present invention is performed for connected grids in an aquifer region adjacent a reservoir region such as shown at 20 and 22 of FIG. 2 of an aquifer.

Figure 5:
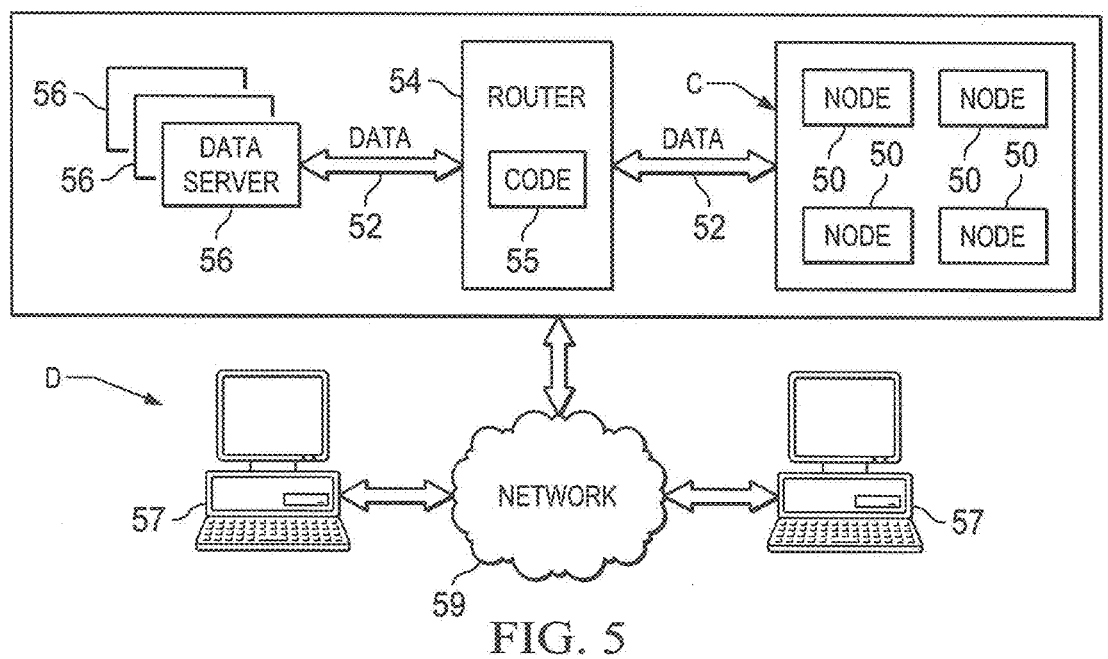
FIG. 5 is a schematic diagram of a computer network for fully-coupled fully-implicit wellbore modeling according to the present invention.
Figure 6:
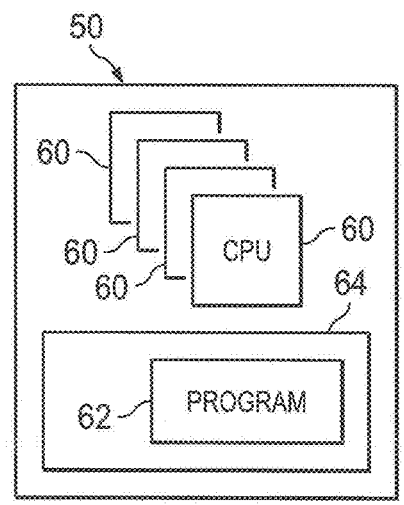
FIG. 6 is a schematic diagram of an application server or computer node of the computer network of FIG. 5.

As will be set forth, the methodology of the present invention maintains the original fine grid data for constructing the 3D connected graphs, connection factors (transmissibilities), pore volumes, and compressibilities. The present invention however reduces the active cell counts in the nonlinear and linear solution space of the reservoir simulation. Fine grid pressure is determined for an aquifer from a cell-center pressure using a vertical equilibrium condition within an amalgamated aquifer coarse grid cell. The processing is parallel distributed and load balanced across all processing cores of the engaged HPC simulation system hardware (FIGS. 5 and 6). The present invention is also, as described below, capable of providing the same results as an original fine-grid simulation model, but runs at a fraction of the original simulation time for computerized processing.

Aquifer cells in a reservoir simulation grid contain a single aqueous phase. Because water is only slightly compressible, the present invention forms a connected vertical column of aquifer cells. The aquifer cells of the connected vertical column are in hydrostatic equilibrium and a pressure profile for the aquifer cells varies with the gravitational potential, which is a function of water density and depth. Thus with the present invention, it has been found sufficient to determine a single pressure value at a given depth to obtain a vertical pressure distribution for a column of connected aquifer cells.

In accordance with the present invention, a grid amalgamation methodology is provided for the connected column of aquifer cells to reduce the active cell counts for the overall simulation model, such as that shown in FIG. 1 or FIG. 2. The present invention retains the full geologic description of the original model and the aquifer can contain complex structure relief, faults, fractures, and the like. Therefore, reservoir engineers and analysts are able to work with original geological model data to do history matching and field prediction just as is done with the original conventionally obtained simulation model. The present invention is applicable to a great number of currently available reservoir simulation models using either a structured grid or an unstructured grid representation. The present invention is equally applicable to single-porosity or multi-porosity multi-permeability models. The accelerated processing provided by the present invention can also easily be accomplished by a single keyword in a model file.

Figure 3B:
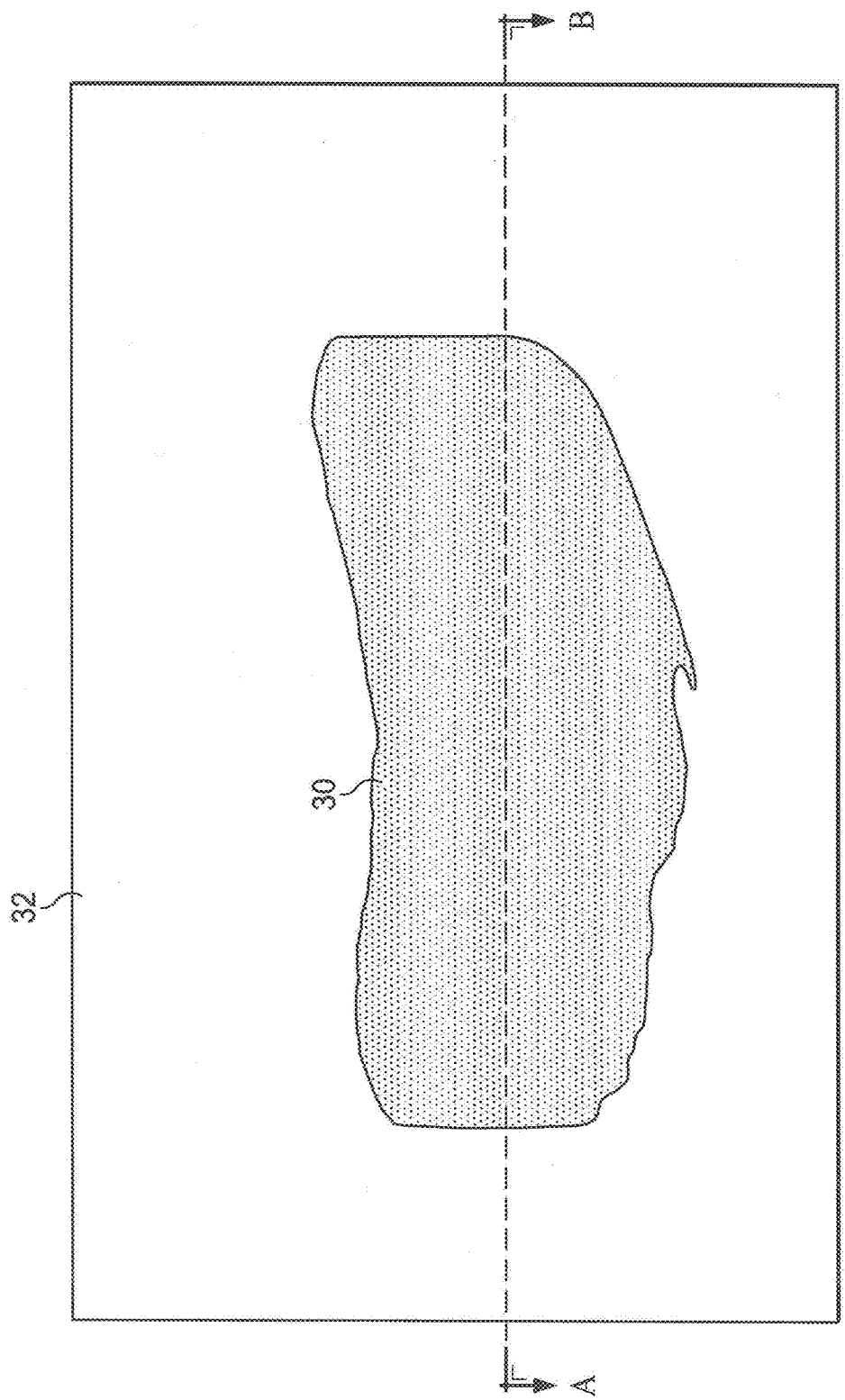
FIG. 3B is a plan view of the reservoir simulation model of FIG. 3A.

FIG. 3 illustrates a schematic diagram of a reservoir simulation model R with a reservoir (hydrocarbon bearing) region 30 of grid cells for the reservoir model M. As also shown in FIG. 3, the hydrocarbon region 30 of grid cells is bordered by a peripheral aquifer region 32 of grid cells. As the reservoir depletes, pressure in the reservoir region 30 declines and water encroach from the aquifer region 32 into the hydrocarbon reservoir region 30. Water influx provides pressure support to the reservoir and improves hydrocarbon recovery. However, water production increases over time with an attendant increase in operation cost due to extra fluid lift requirements, and provision of surface facilities to handle the additional water production.

Figure 4:
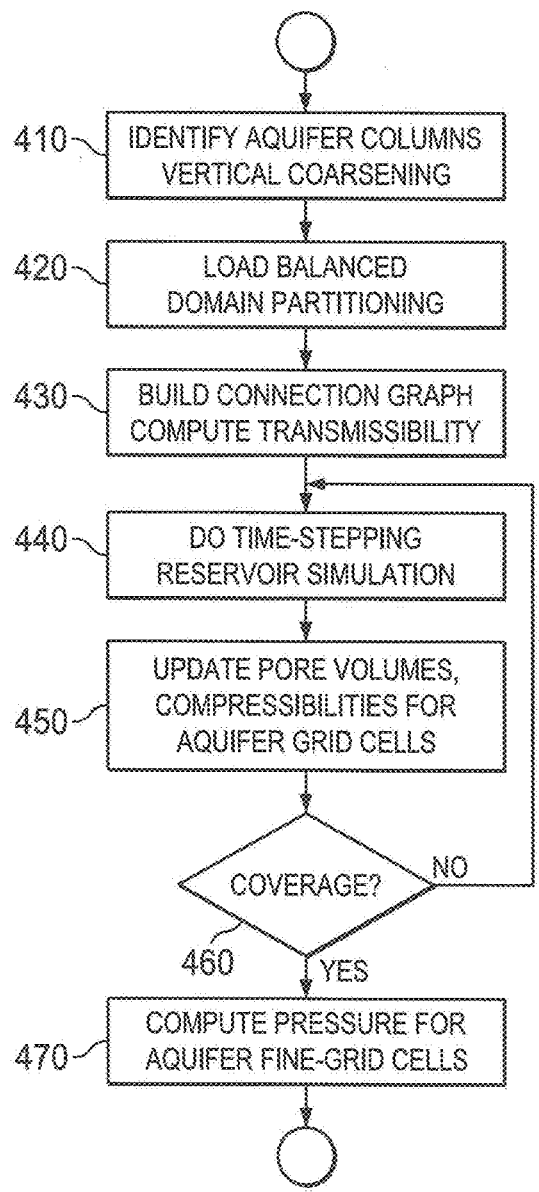
FIG. 4 is a functional block diagram or flow chart of computer processing steps for improved parallel reservoir simulation with accelerated aquifer calculation according to the present invention.

FIG. 4 is a functional block diagram or flow chart of computer processing steps for improved parallel reservoir simulation with accelerated aquifer calculation according to the present invention. Reservoir simulation grids (both structured and unstructured) are layered to follow the sedimentological setting. The processing according to FIG. 4 is based on parallel distributed unstructured data infrastructure for reservoir simulation disclosed by the present author in the previous disclosure in U.S. Pat. No. 8,386,227, "Machine, computer program product and method to generate unstructured grids and carry out parallel reservoir simulation"; U.S. Pat. No. 8,433,551, "Machine, computer program product and method to carry out parallel reservoir simulation"; and U.S. Pat. No. 9,177,086, "Machine, computer program product and method to carry out parallel reservoir simulation", of which Applicant Fung is a named inventor.

In the processing of FIG. 4, simulation grid cells are sequenced vertically first, then areally second. Method Step 410 identifies aquifer columns based on certain criteria and then performs aquifer coarsening. The criteria include that if saturation is an input property and water saturation of all the active cells in a column is greater than (1−ε), where ε is a very small number, the column is flagged as aquifer column. Another of the criteria is that if saturation is calculated internally in the reservoir simulator, the depth of each cell is compared to the oil water contact (OWC). A column is identified as an aquifer column if the depth of all the active cells in this column is deeper than the OWC at that location. Another of the criteria is that if there is any well perforation in a column, this column is not identified as an aquifer column.

For those identified aquifer columns, cells are grouped into connected grid blocks, which are referred to with the present invention as vertically amalgamated grid blocks or coarsened grid blocks. If the entire column is hydraulically connected, it is a single amalgamated grid block for that aquifer column. In this case, there is only one active grid cell for the entire column during the nonlinear and linear solution phase, where the bulk of the simulation execution time resides and is dependent on the number of reservoir cells (hydrocarbon and aquifer) being simulated.

For accounting purposes, the first cell is labeled as active and the remainder as VE-INACTIVE. If the original simulation model contains a large aquifer region, the number of active cells during the solve phase can be significantly reduced.

Figure 8A:
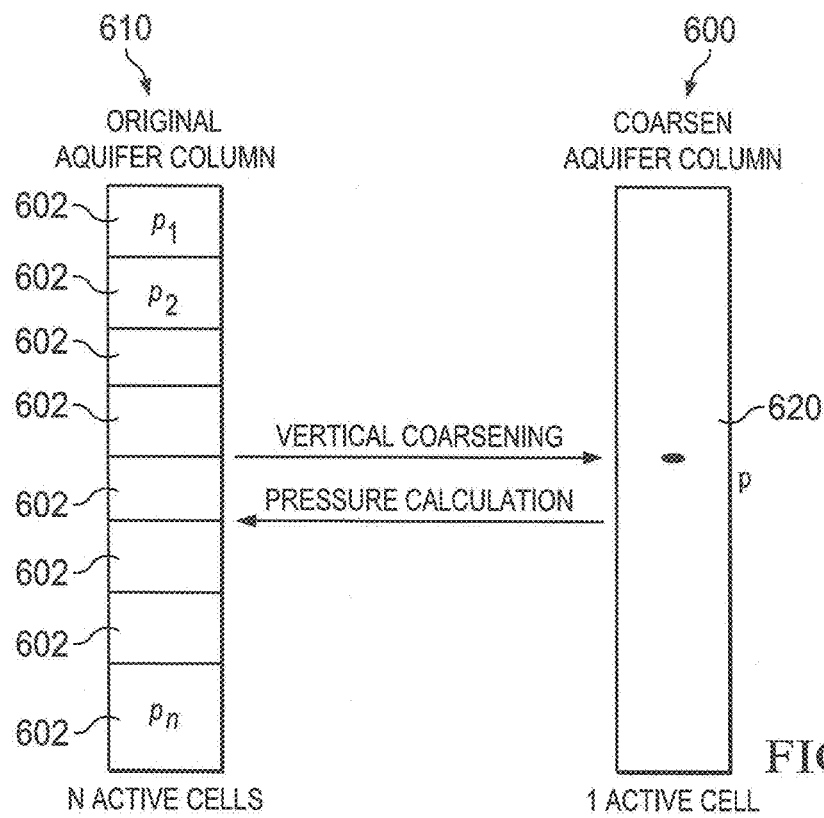
FIGS. 8A, 8B, and 8C are schematic diagrams of vertical coarsening for an aquifer column of a simulation model according to the present invention.
Figure 8B:
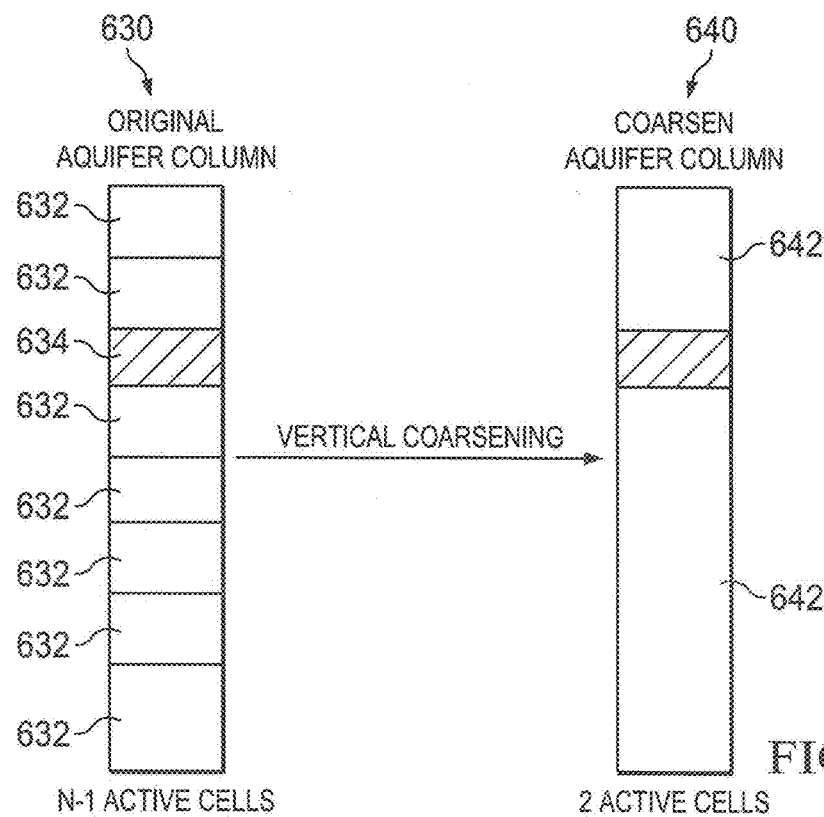
Figure 8C:
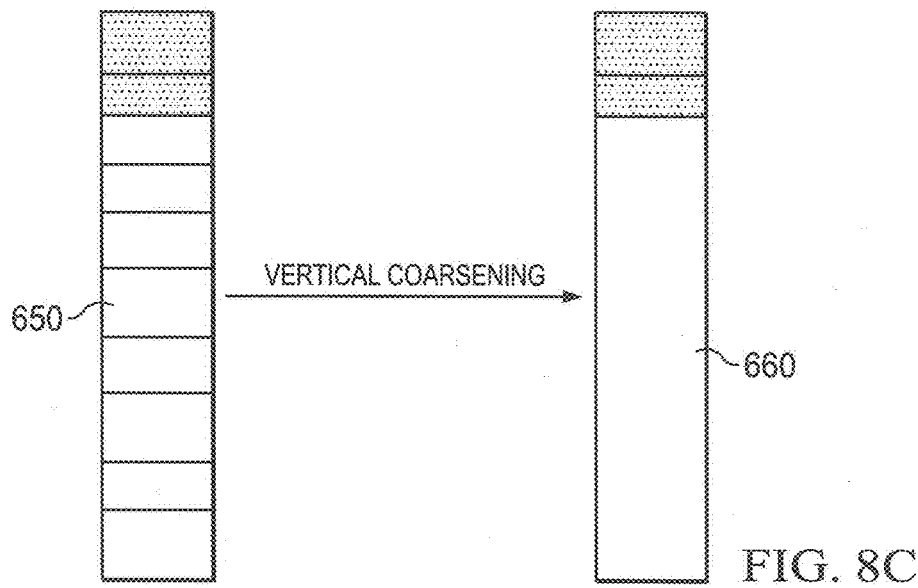

As illustrated in FIG. 8A, a large vertical grid block 600 aggregates the volume of N active aquifer fine grid cells 602 and the center depth of the grid block 600 is the center depth of the entire aquifer column. Reference numeral 610 illustrates a connected aquifer column of fine grid blocks 602 and reference numeral 620 is the amalgamated coarse grid block after vertical coarsening. If the model is dual-porosity dual-permeability, for each column position, there is an amalgamated matrix aquifer cell and an amalgamated fracture aquifer cell. If there are inactive cells in an aquifer column, the aquifer column contains multiple blocks as illustrated in FIG. 8B. In FIG. 8B, reference numeral 630 illustrates a disconnected aquifer column of N−1 grid cells 632 separated by a barrier 634 and reference numeral 640 shows the two amalgamated coarse blocks after vertical coarsening.

Figure 8D:
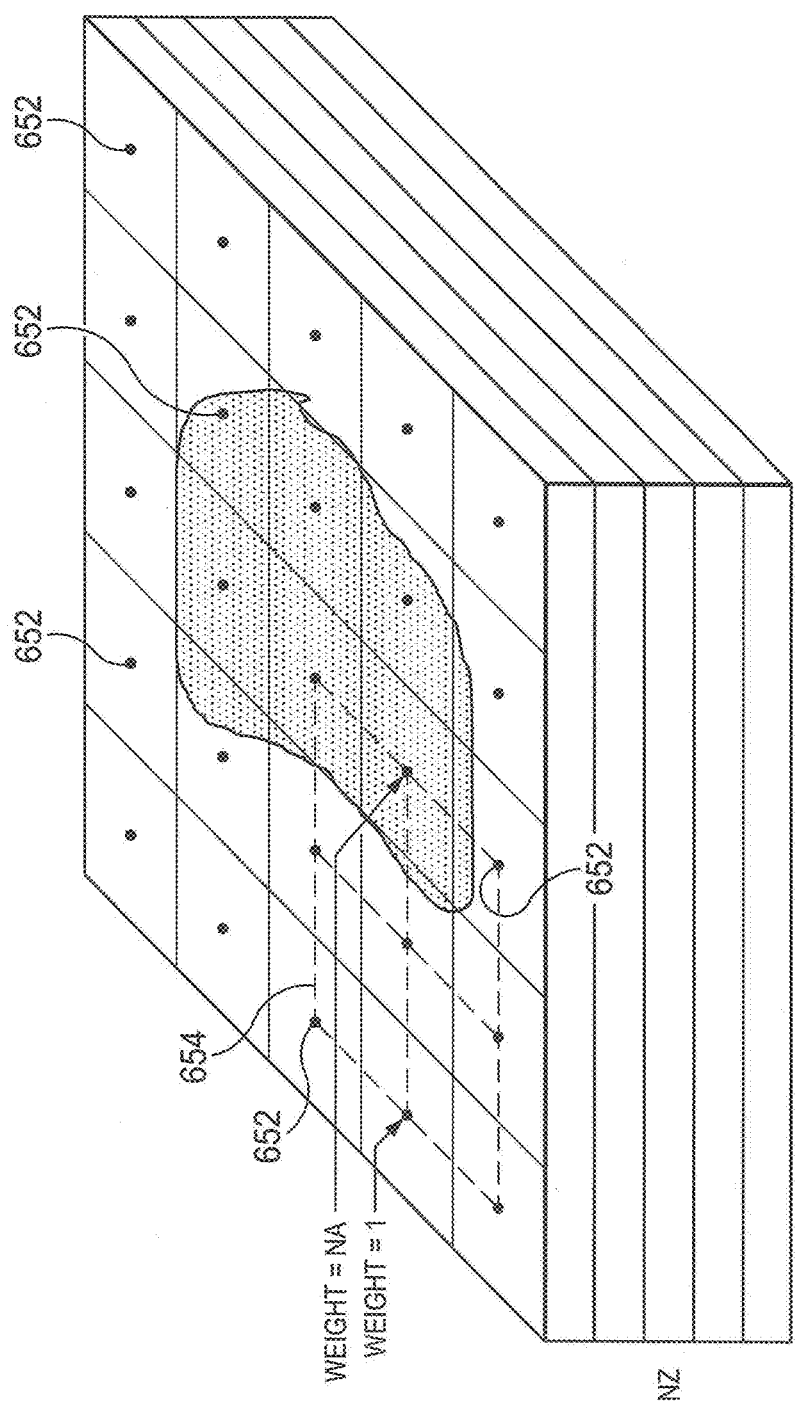
FIG. 8D is a schematic diagram of a reservoir simulation model illustrating node weighting for parallel graph partitioning according to the present invention.

Method step 420 (FIG. 4) computes the load balanced domain partitioning using a graph partitioning software routine which balances subdomain weights and minimizes edge cuts. Each node of the graph represents a column of grid cells and the active cell count is the node weight. This is illustrated in FIG. 8D. Each solid circle 652 is the center of a grid cell column. The dotted lines 654 connecting solid circles 652 represent a connection of the graph and the columns form the nodes of the 2D graph. The subdomain weight is the sum of the weights of all the columns belonging to that subdomain.

For an aquifer column which has one amalgamated block, the weight is 1. For a non-aquifer column, the weight is NA (Number of active grid cells in a column). NA=NZ if all the cells are active in a column. The node weight is calculated based on the amalgamated block counts as illustrated in FIG. 8D. If the column is dual-porosity and both are active and connected, the count is 2. For a non-aquifer column, the weight is the number of active cells in the column.

Method step 430 generates the distributed cell-level connectivity graph and computes the connection factors, also known as transmissibilities. To maintain the full geological description in the aquifer, the new connections and connection factors (transmissibilities) are set up to account for the geometric and permeability information of the original aquifer fine grid cells.

There are three scenarios according to the present invention for determining cell connections and transmissibilities: (1) An aquifer column adjacent to an oil column; (2) An aquifer column adjacent to an aquifer column; and (3) An oil column with a bottom aquifer. These are explained below:

1. An Aquifer Column Adjacent to an Oil Column

Figure 9:
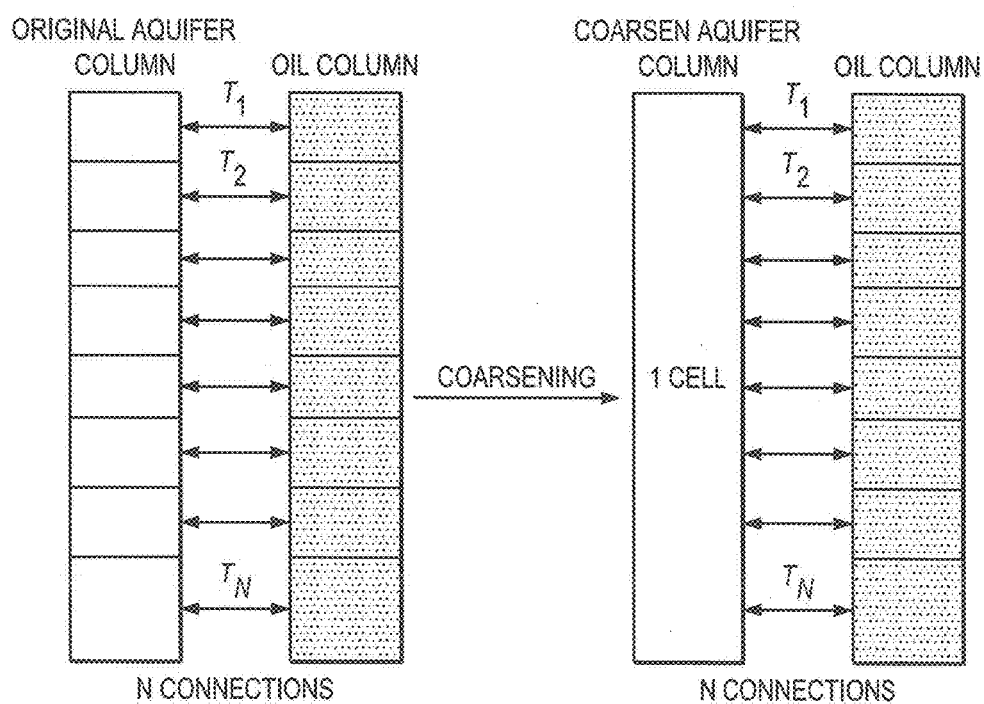
FIG. 9 is a schematic diagram of cell connectivity between cells of columns in a simulation model.

In FIG. 9, if N aquifer cells in a column have been amalgamated, the original one-to-one lateral cell connections has become one-to-many lateral connection of the amalgamated block to N oil column cell connections, while the transmissibility values remain the same, this means the transmissibility between aquifer column and cell number i in oil column is the same as the transmissibility between cell number i in original aquifer column and cell number i in oil column. The vertical connections in aquifer column vanish as there is one amalgamated block.

2. An Aquifer Column Adjacent to an Aquifer Column

Figure 10A:
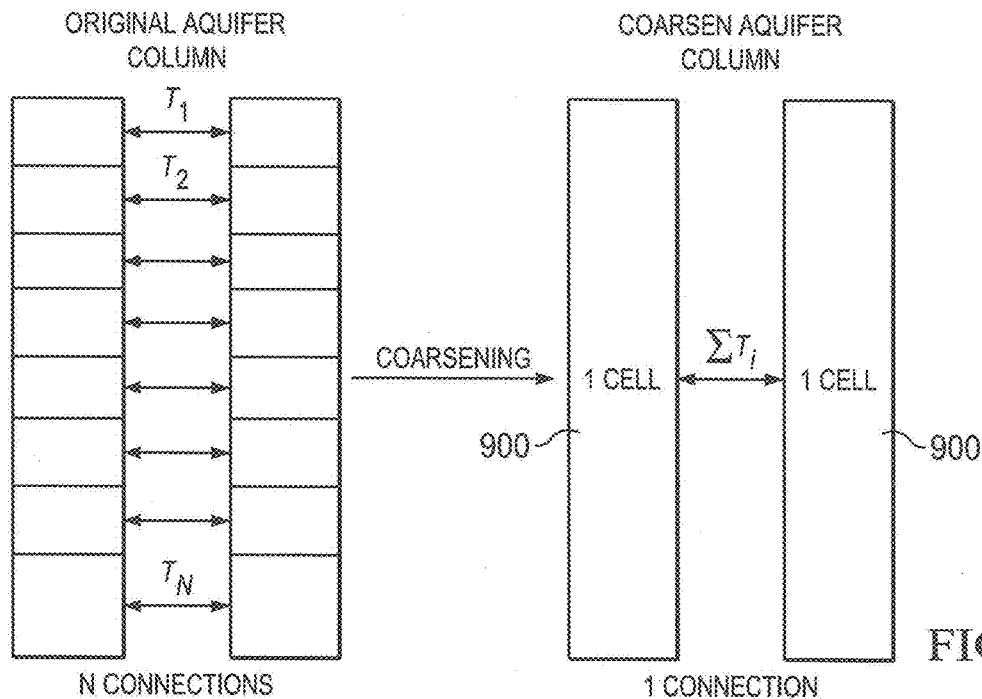
FIGS. 10A, 10B, 10C, and 10D are schematic diagrams of cell connectivity between aquifer columns according to the present invention in a simulation model having a peripheral aquifer region.

In FIG. 10A, for the simplest case where aquifer columns can be coarsened to only one amalgamated aquifer block 900 per column, the original N lateral cell connections reduce to one connection between the two amalgamated blocks. The number of cell connections is reduced significantly. The new transmissibility $T_{new}$ is the sum of the N original transmissibility $T_i$ as given by:

$$T_{new} = \sum_{i}^{N} = 1^{T_i} \qquad (13)$$

Figure 10B:
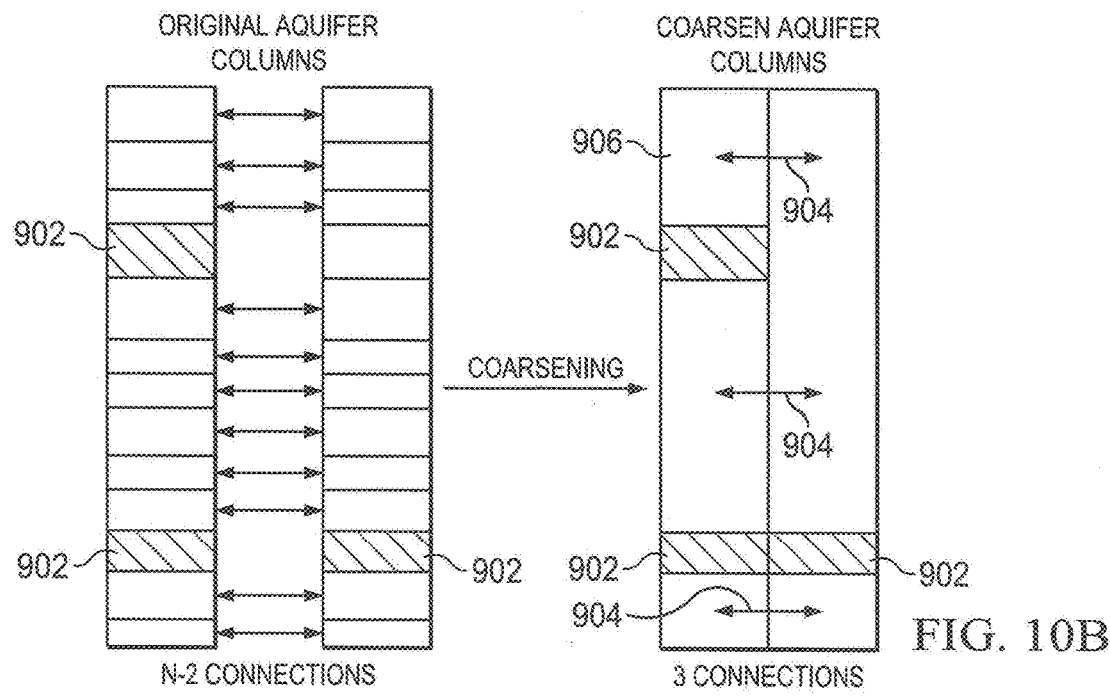
Figure 10C:
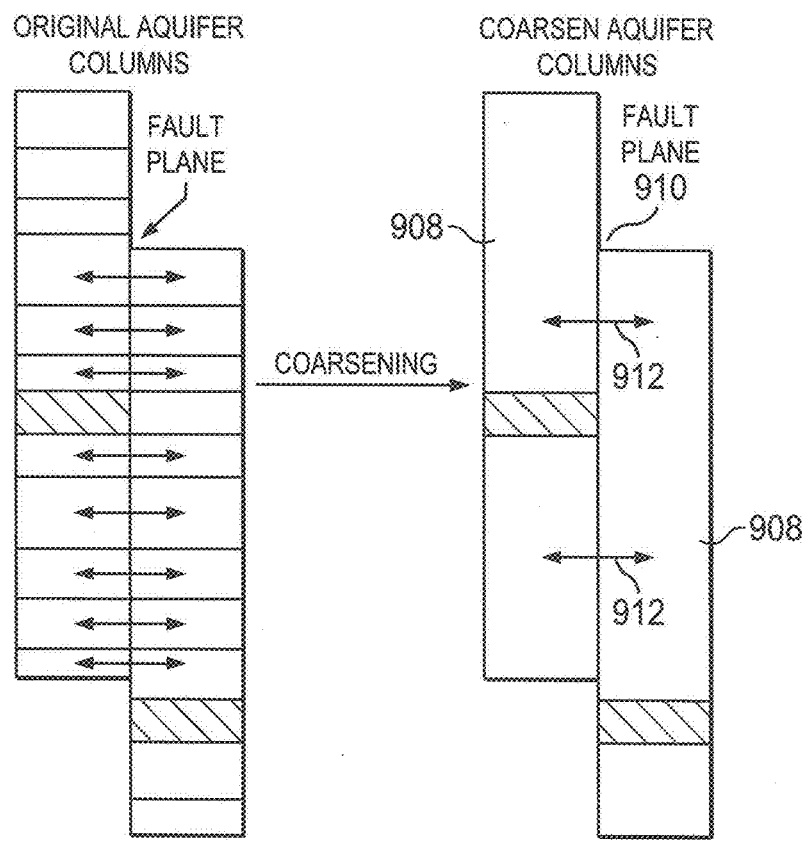

A more general case is shown in FIG. 10B where there are flow barriers 902 in aquifer column. In this illustration, there are three lateral connections 904 between the two amalgamated aquifer columns 906. FIG. 10C illustrates the connections between two aquifer columns 908 involving a conductive fault plane 910 in between. In this example, two lateral connections 912 between the two amalgamated columns exist.

3. An Oil Column with a Bottom Aquifer

Figure 10D:
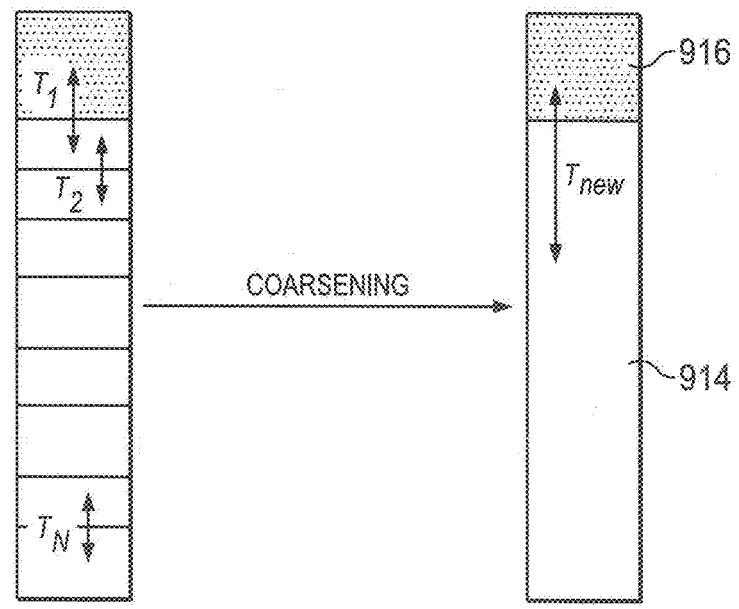

In FIG. 10D, if N bottom aquifer cells in an oil column have been amalgamated, the original N vertical cell connections have become one vertical connection between the amalgamated block 914 and oil cell 916. The vertical connections in aquifer vanish as there is one amalgamated block 914. The new transmissibility value is taken as the pore volume weighted average of the harmonic mean of the fine cell transmissibility, which is given by the following formulation:

Denote $T_i$ to be the original fine cell transmissibility and $PV_i$ to be the pore volume of the cell i in the amalgamated aquifer block. The new transmissibility is pressed as:

$$T_{new} = \frac{\sum PV_i * \text{HM\_T}_i}{\sum PV_i} \text{ for } i = 1, \ldots, N$$

where $$\text{HM\_T}_i = \frac{2 * \text{HM\_T}_{i-1} * T_i}{\text{HM\_T}_{i-1} + T_i} \text{ for } i = 2, \ldots, N$$

and $$\text{HM\_T}_1 = T_1$$

Step 440 (FIG. 4) is the simulator time-stepping loop which includes the nonlinear and linear solution process performed by the reservoir simulator. Nonlinear iteration and linear solution are carried out in the reservoir simulator in the conventional manner. However, as explained above, with the present invention the number of aquifer cells being processed in the reservoir simulator is greatly reduced by the formation of the amalgamated active aquifer cells.

In step 450, the pore volumes for amalgamated cells are updated differently. As porosity is updated nonlinearly with pressure and there might be heterogeneity in compressibility or different reference porosities in the fine cells, the updated pore volume of the amalgamated cells should be the sum of the updated pore volumes of the original fine cells given by:

$$PV = \sum_{j=1}^{N} BV_i * \varnothing_i \tag{14}$$

where the porosity of cell i is calculated as:

$$\varnothing_i = \varnothing_r * e^{(c_i(P_i - P_r))} \tag{15}$$

Step 460 is a convergence check for the time-stepping process in reservoir simulation. The convergence tolerance for amalgamated aquifer cells is the change criteria for the cell pressure, and the residual tolerance for the material balance. This is similar to conventional convergence tolerance criteria.

Step 470 populates the aquifer fine cells using the equilibrium condition inside the coarse cell and its pressure solution update. Pressure for the original fine grids in the aquifer is updated using the following equilibrium formula:

$$P_i = P + (\text{depth}(i) - \text{depth}) * \rho g \tag{16}$$

In Equation 16, P is pressure of the amalgamated block and $P_i$ is pressure of the fine grid cell i used for computing fine-cell porosity update in Equation 15 above as well as detail pressure map output. The processing and method steps of FIG. 4 are suitable for deployment on a variety of today's HPC hardware. These are typically rack mounted hardware with several compute nodes which contains multiple CPUs with multi-core architecture. Nodes are interconnected with conventional low latency high bandwidth networks, switches, and routers.

The typical HPC environment for use with this simulation system is today's multi-node, multi-CPU, multi-core compute clusters. An example such cluster is illustrated at C in the data processing system D of FIG. 5. The cluster C is formed of a plurality of computer nodes 50 (FIGS. 5 and 6) which are provided with data in parallel as indicated by and arrow 52 by a router server or servers 54. If desired, several such router servers may be used for this purpose. Original simulation or input data of the types described above is stored in a suitable number of data storage/file servers 56. The router servers 54 under control of computer code 55 stored in memory transfer input simulation data in parallel from the storage servers 56, as well as simulation processing results as indicated by an arrow 58, to and from the computer nodes 50 of the cluster C. The program code 55 according to the present invention is in the form of non-transitory computer operable instructions causing the server or servers 54 to index, order and transfer the data. Typically, the data processing system D includes a set of work stations 57 of suitable, conventional type which are connected to the system by a network 59.

The computer nodes 50 of the cluster C include a plurality of processors or cores 60 of the type illustrated in FIG. 6 operating in parallel under instructions of a computer code or program product 62 stored in stored in memory 64 of the computer nodes 50. The program code 62 according to the present invention is in the form of non-transitory computer operable instructions causing the data processors 60 to perform parallel reservoir simulation with accelerated aquifer calculation according to the present invention.

It should be noted that program codes 55 and 62 may be in the form of microcode, programs, routines, or symbolic computer operable languages that provide a specific set of ordered operations that control the functioning of the data processing system D and direct its operation. The instructions of program codes 55 and 62 may be stored in memory of the servers 54 or processor nodes 50, or on computer diskette, magnetic tape, conventional hard disk drive, electronic read-only memory, optical storage device, or other appropriate data storage device having a non-transitory computer usable medium stored thereon. Program code 60 may also be contained on a data storage device such as server 56 as a computer readable medium, as shown.

RAM and cache memory are distributed and local to each compute node and are shared by the processing cores on each the node.

The physics simulated by the system of the present invention is a tightly coupled, global multiphase flow problem which is both convective and diffusive in nature. A high bandwidth, low latency network is thus preferred to minimize inter-process communication overhead. The message passing interface (MPI) standard is used for inter-process communication operations while MPI-2 is used for parallel I/O operations. Disk storage for simulation or model data and processing output results are typically on centralized NAS, SAN, GPFS, or other parallel file systems. For smaller scale parallelism, local hard disk storage which resides on the cluster can also be used. Parallel distributed I/O methods are used to minimize read/write time from/to disk during simulation.

The symbols in the above equations have these meanings:
i=Cell number in an aquifer column
ρ=Water density
c=Rock compressibility
g=Gravitational constant
P=Pressure
Ø=Porosity
$P_r$=Reference pressure
PV=Pore volume
BV=Bulk volume
Assume a simulation model has the following properties:
NZ=Number of Layers
x=Percentage of aquifer columns
T=the original running time The present invention would have an estimated performance with an ideal lower bound of the running time:

$$T = \left(1 - x + x\frac{1}{NZ}\right)$$

Figure 7:
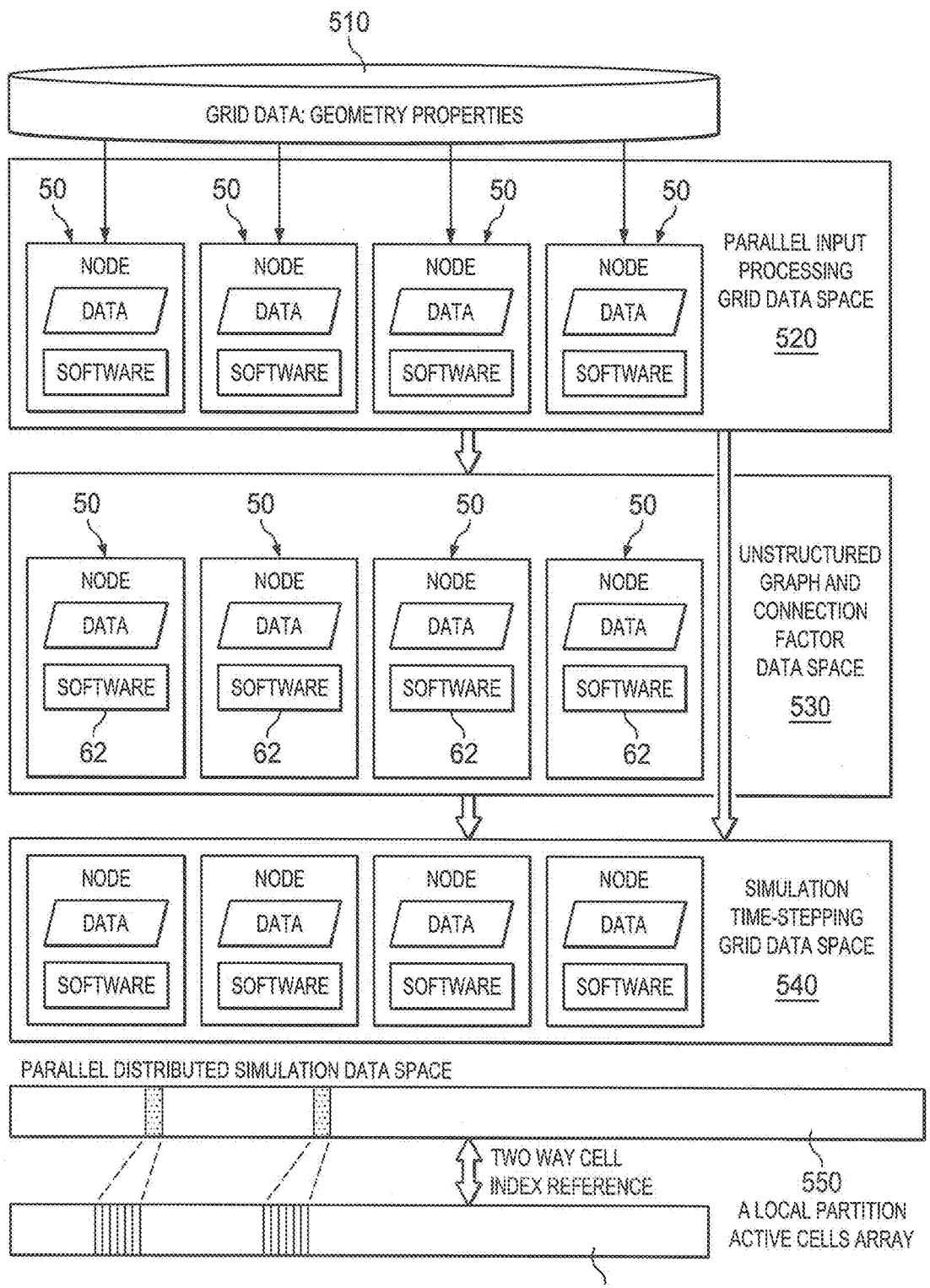
FIG. 7 is a data flow diagram illustrating three stages of distributed parallel grid data according to the present invention in the computer network of FIG. 5.

FIG. 7 shows the parallel data flow diagram as companion to the processing steps in FIG. 4 of the invention. As illustrated, the entire data flow is parallel distributed and involves three main grid data spaces for simulation grid processing: (1) Parallel Input Processing Grid Data Space; (2) Unstructured Graph and Connection Factor Data Space; and (3) Simulation Time-Step Grid Data Space. The first data space is a naïve organization of simple contiguous chucks of the full grid data including dead cells and pinch-out cells. The second data space corresponds to the data space for constructing the parallel graph of active grid cells for the simulation phase. This stage of grid data includes cell geometry information for connection factor calculation and also includes fine-grid aquifer cells which are not a part of the active grid cells for the simulation phase. The third phase is the solution phase where only active cells are involved in the simulation time stepping. There are axillary fine grid aquifer cell arrays to support accurate calculation of amalgamated aquifer cell pore volume and compressibility. The 2-way indexing system is set up during the second stage to refer back and forth between the amalgamated cell and fine grid cells. Discussion begins with the method step in FIG. 4, followed by the explanation of the data spaces to the method steps in FIG. 5.

FIG. 7 is the data flow diagram where disk file grid data 510 from servers 56 are read in consecutive equal chunks into the data space of each parallel processing core, as shown at reference numeral 520 where the grid data is organized column wise. The processing step in reference numeral 410 is a part of the software in reference numeral 510 where information for domain graph partitioning is computed. The processing step 420 creates the simulation grid domain decomposition which is a part of the software in reference numeral 510.

From the simulation domain decomposition, parallel data communication information can be generated for the data transfer protocol from the IO domain data space to the graph and connection factor data space. The methodology for data transfer is essentially the same as detailed in the applicant's previously mentioned U.S. Pat. Nos. 8,386,227 and 8,433,551, except that the grid space 530 includes the active aquifer fine-grid cells which are flagged as VE-INACTIVE. In data space 530, additional code algorithms are available to compute the connections for grid cells between adjacent aquifer-aquifer columns or adjacent aquifer-reservoir columns as discussed above in method step 430.

The resulting connected graph will involves nodes for each active cell (reservoir cells and amalgamated aquifer cells). Software code 62 in nodes 50 as shown at 530 in FIG. 7 also includes graph and cell reordering schemes to suit the particular linear solution methods engaged in the solution process. The graph and cell reordering schemes are like those of applicant's previously mentioned U.S. Pat. Nos. 8,386,227 and 8,433,551.

As shown at 540 in FIG. 7, with all the cell connections set up and information to gather data for the simulation space is ready, grid data are then transferred from input subdomain partitions to the simulation subdomain partitions, where each of the inactive cells are removed. However, some grid data for the fine grid aquifer cells, including the ones flagged as VE-INACTIVE are still needed in the simulation phase, for the purpose of updating the composite pore volumes and compressibilities of the amalgamated aquifer cell, and to store the computed fine grid pressure solution whenever it is required. This is illustrated as data reference numerals 550 and 560. The active cell data 550 is like those of applicant's previously mentioned U.S. Pat. Nos. 8,386,227 and 8,433,551, where only active cells are involved in the solution process as the simulator performs time stepping. Reference numeral 560 depicts the aquifer fine cells and the two-way index reference between them as new data items constructed to support the correct pore volume and compressibility update for the amalgamated aquifer residing in reference numeral 550. Data reference numeral 560 is the aquifer fine grid data to provide accurate pore volume and compressibility calculation for the amalgamated cells and is not directly involved in the nonlinear or linear solution process.

Figure 11:
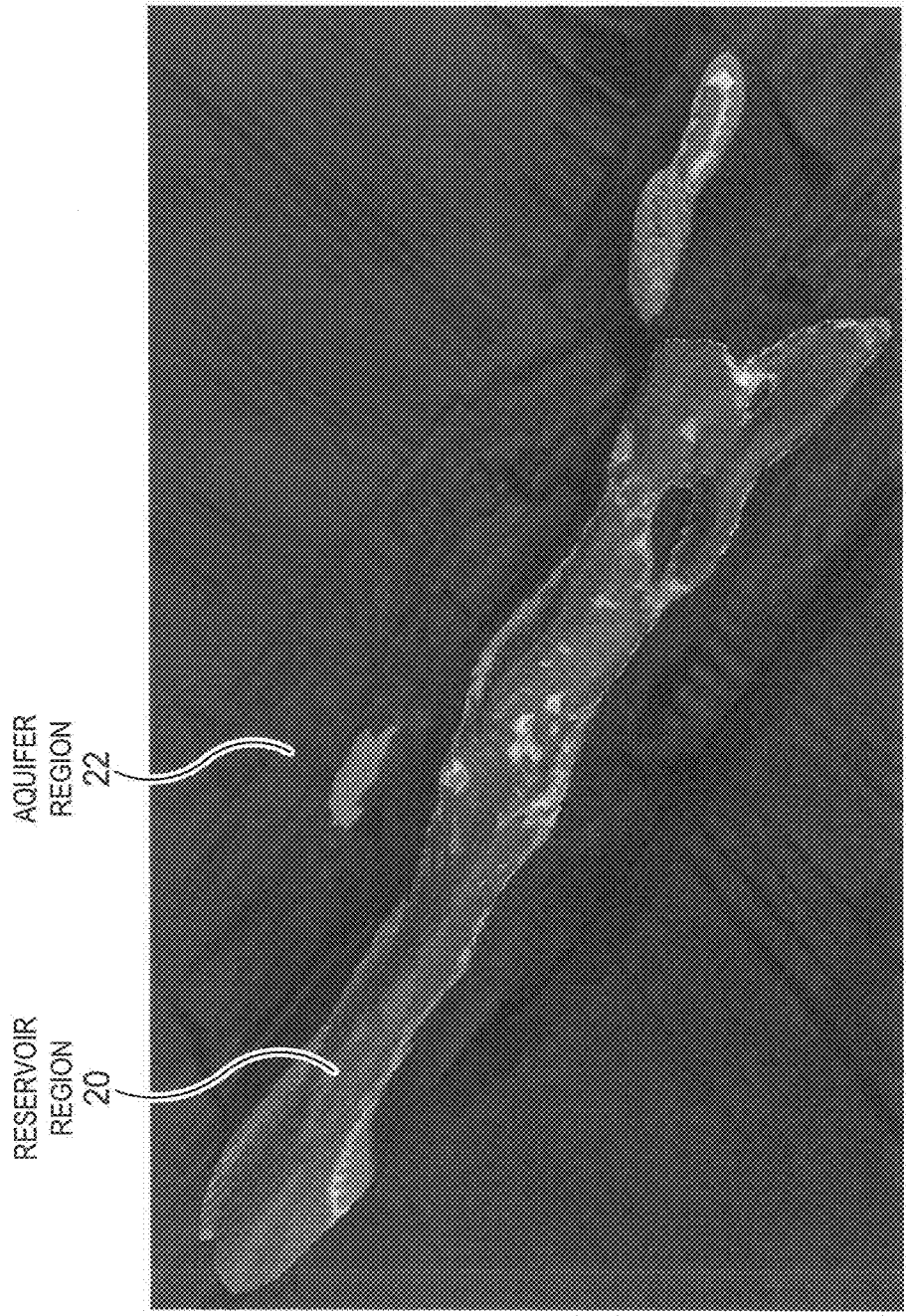
FIG. 11 is an isometric view of an example reservoir simulation model for a test study according to the present invention.

A full-field case study is included which is a 9.5 million grid-cell (450.1249*17) three-phase black-oil reservoir model with 2,959 wells. A picture of the reservoir model is shown in FIG. 11. The reservoir model includes extensive aquifer description. Aquifer water influx is known to be significant and variable across the reservoir boundaries of the subject reservoir.

Figure 12A:
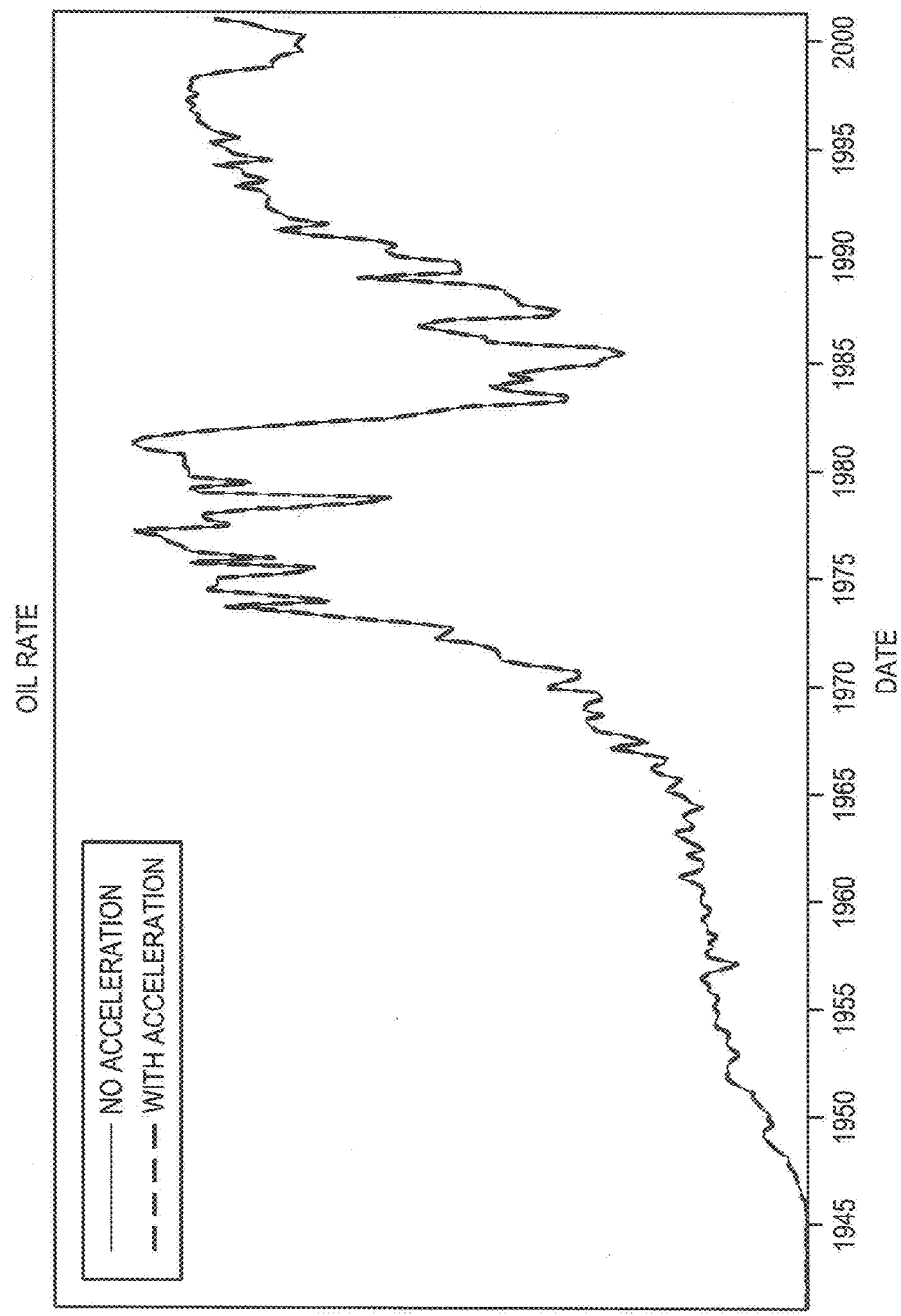
FIG. 12A is a plot of comparison results of oil rate as determined by reservoir simulation according to the present invention and according to conventional reservoir simulation.
Figure 12B:
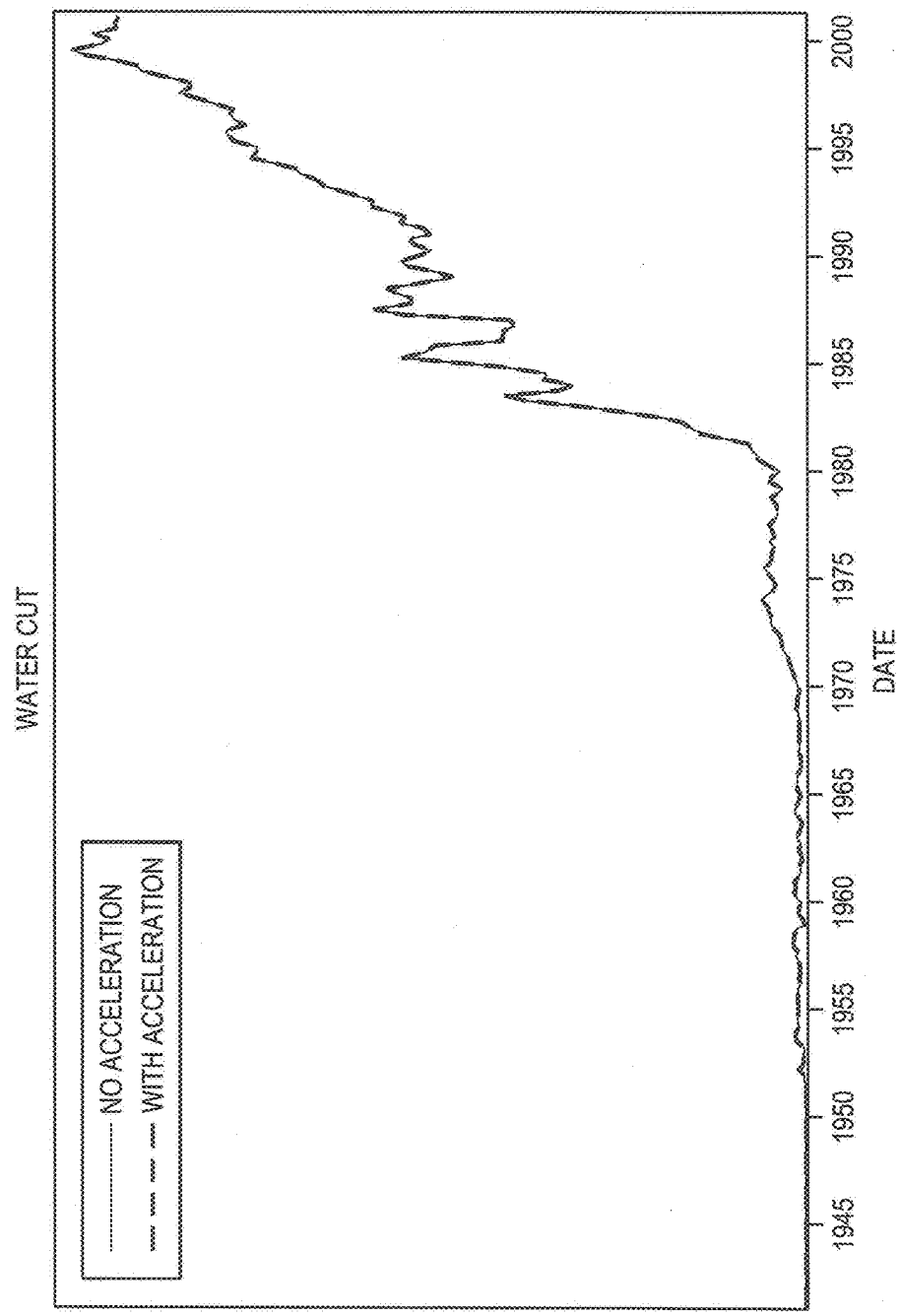
FIG. 12B is a plot of comparison results of water rate as determined by reservoir simulation according to the present invention and according to conventional reservoir simulation.
Figure 12C:
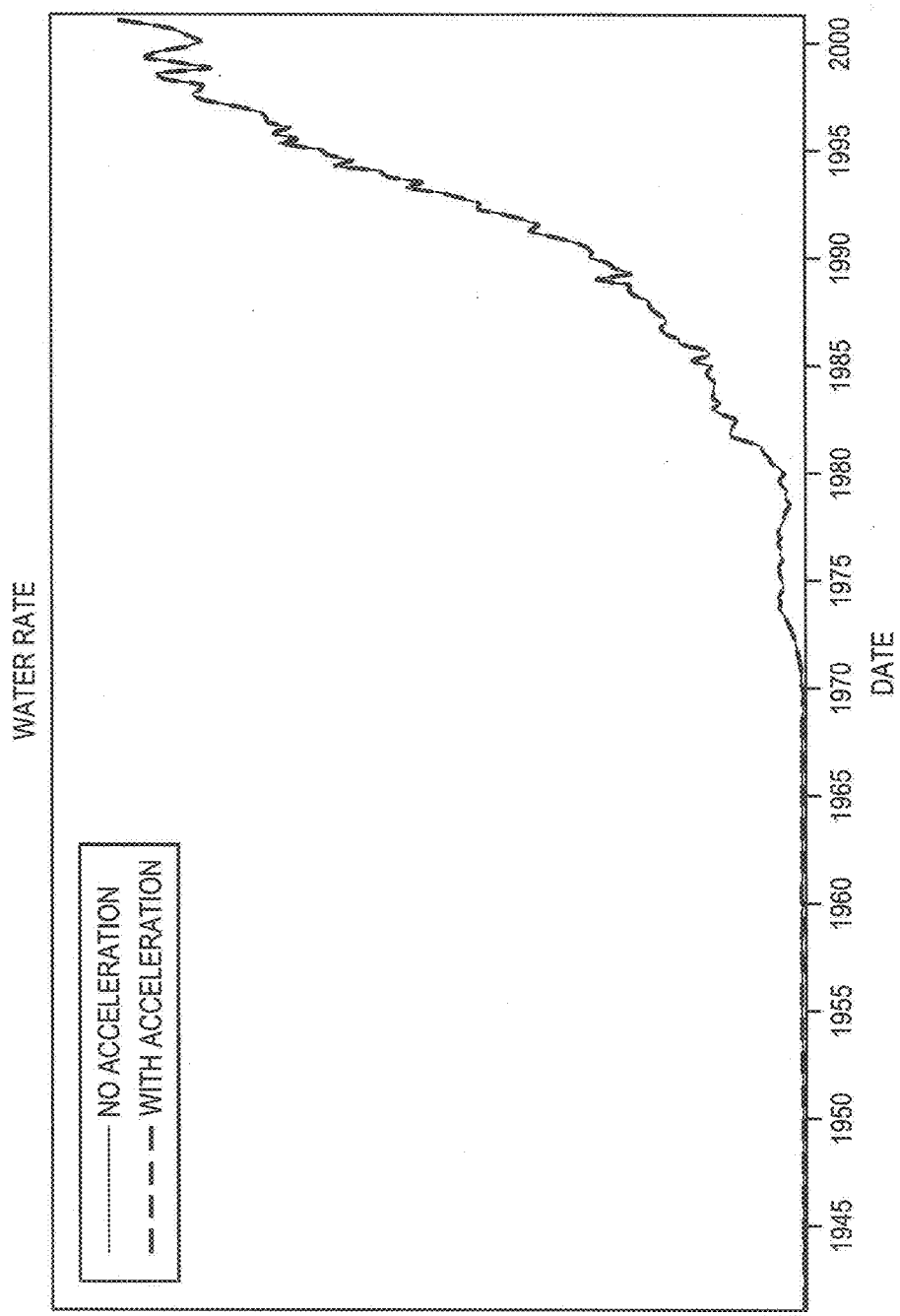
FIG. 12C is a plot of comparison results of water cut as determined by reservoir simulation according to the present invention and according to conventional reservoir simulation.
Figure 12D:
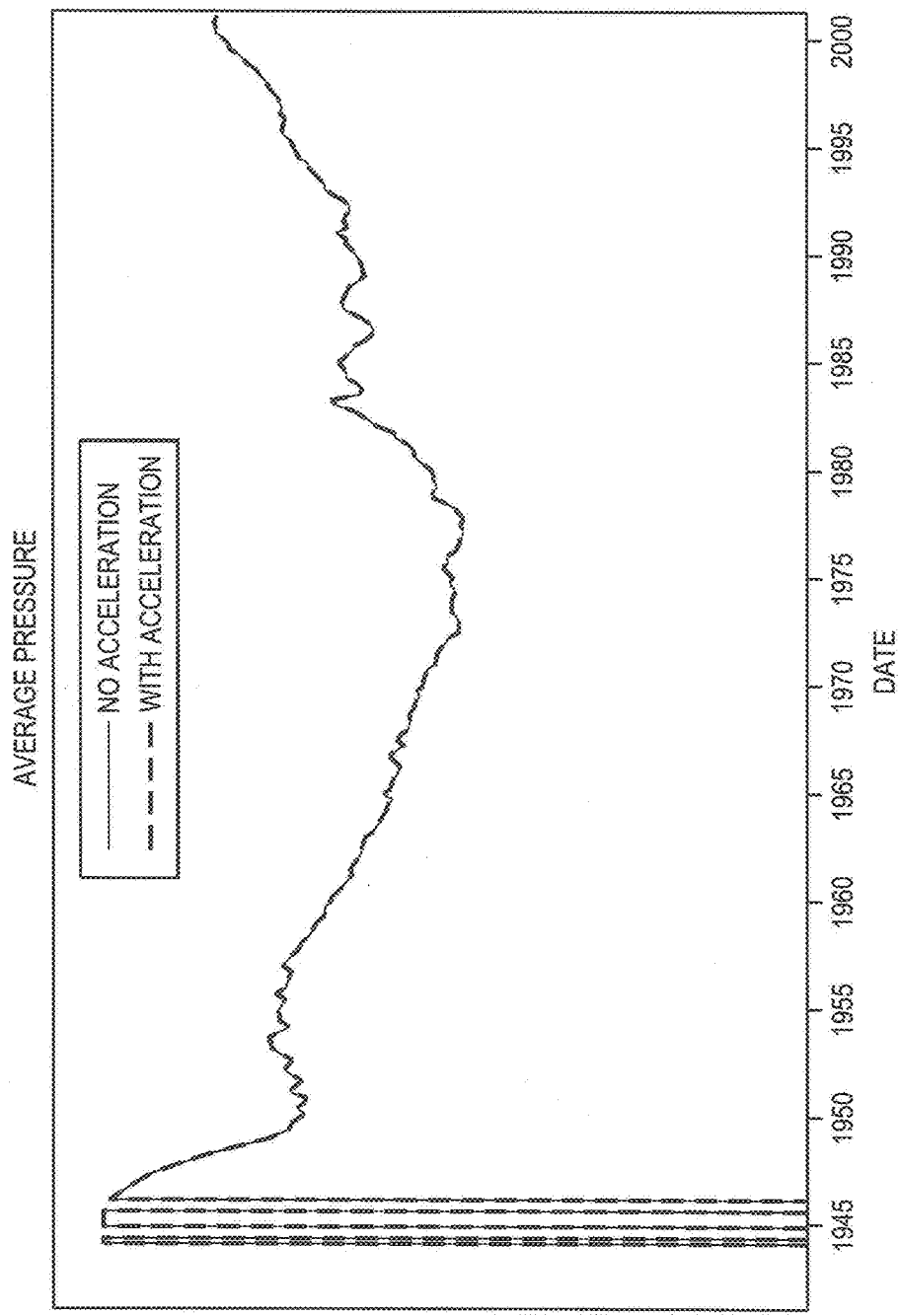
FIG. 12D is a plot of comparison results of average pressure as determined by reservoir simulation according to the present invention and according to conventional reservoir simulation.

FIGS. 12A through 12D show the production rates and pressure plots as example reservoir production measures using the present invention as compared to currently practiced reservoir modeling in the conventional method for current commercial simulators. FIG. 12A is a comparative plot of oil rate determined with reservoir simulation with accelerated aquifer calculation according to the present invention as compared to currently practiced reservoir modeling with aquifer cells being processed in the same way as the hydrocarbon bearing regions. No discernible differences can be seen in the results. FIGS. 12B, 12C and 12D are comparable comparative plots of water rate, water cut and average pressure, respectively, each comparative plot also determined with reservoir simulation with accelerated aquifer calculation according to the present invention as compared to currently practiced reservoir modeling with aquifer cells being processed in the same way as the hydrocarbon bearing regions. As with the plot of FIG. 12A, no discernible differences can be seen in the results plotted in FIGS. 12B, 12C and 12D. These results demonstrate the efficacy and of the present invention its fidelity in accurately representing model flow physics and runs at a fraction of the cost of conventional modeling.

The present invention provides an improved and more efficient methodology to accelerate the computation of grid cells in aquifer regions of reservoir simulation models. While the present invention can be used in conjunction with a variable number of equations per grid cell solver method if that is available, the acceleration achieved using this method is much greater, making the inclusion of less efficient methods unnecessary. The present invention accelerates the simulation by reducing the required cell counts in the aquifer. It reconstructs the fine grid solution in the aquifer by using vertical equilibrium calculations within the amalgamated coarse cell. If the vertical column of grid cells is connected, the potential saving multiple is roughly equal to the number of layers in the model. Thus, a 100 layer model will be nearly a factor of 100 saving for the aquifer region.

The present invention accelerates reservoir simulation computer processing runs by aggregating aquifer grids and then using vertical equilibrium to compute pressure distribution inside the amalgamated grid. The present invention retains the fine-scale heterogeneity in both porosity and permeability in the aquifer and, at the same time, reduces the number of active cells and connections to be solved by the simulator. New processing steps are added to determine the correct aggregation scheme, and to load balance the model based on the active cell count during the solution phase. This is more efficient than the presently available methods in commercial simulators, which solve for every aquifer grid cell. During the solution phase, all balance equations can be handled in the usual way. Spillage of oil into the aquifer is modeled, at the coarsened grid level and may be detected in the simulation phase to indicate de-amalgamation requirement when that occurs. Simulation results provide a full pressure profile at the fine-grid level including the aquifer region.

With the present invention, a methodology is provided to detect vertically connected columns of aquifer cells. The present invention is general and applicable to various equilibrium or non-equilibrium initialization methods in current art simulators. The simulation model can be of the single-porosity type or the multi-porosity multi-permeability type. The model may contain various types of geologic complexities, including faults, pinch-out cells and dead cells. This data is used to construct vertically coarsened aquifer cells. These coarsened cells carry the internal heterogeneities in porosity, permeability, and the pore compressibility of the underlying fine cells. However, only a single pressure solution is needed to fully define the pressure distribution within the coarsened aquifer cell, containing an amalgamated column of connected fine-cells. The overall computational work is proportional the active cell counts which is now significantly reduced. The larger the aquifer region, the bigger the computation processing time and cost saving will be.

The present invention uses the active cell counts per column of grid cells to do parallel domain decomposition and load balancing. It include a new distributed data management system to manage the transfer of parallel distributed input data into the parallel distributed work space for building the parallel distributed 3D connectivity graph and the associated transmissibility (connection factors), as well as another system to manage the transfer of parallel distributed input data into two parallel distributed simulation data space: (1) the usual active grid cell data space, and (2) the aquifer fine grid cell data space. The active grid cell data space contains the coarsened aquifer cells. There is a two-way reference system between the active grid cell data space and the aquifer fine grid data space. The aquifer fine grid data space contains the necessary and sufficient data to construct the Jacobian matrix terms and the residual terms for the equations corresponding to the coarsened aquifer cells. The aquifer fine grid pressure is computed using vertical equilibrium after the solution from the reduced solution space is obtained. The aqueous phase flow term (water influx) for each of the fine-grid cell face of the original simulation model can be computed at each time step or whenever it is needed after the accelerated solution is obtained from the reduced solution space.

The present invention accelerates the simulation of a reservoir model which may include a large aquifer region in the model. Simulators in the current art perform mass, fluid flow and transport calculation for the aquifer grid cells in the same way as the reservoir grid cells containing hydrocarbon. In some cases, it may be possible to exclude calculations for the hydrocarbon material balances if these aquifer grid cells can be known a priori as single aqueous phase only grid cells throughout the simulation and hydrocarbon encroachment into the aquifer does not occur. This is not done typically as this treatment requires additional complexity in the solver which can provide variable numbers of equations per grid cell. This additional complexity would slow down computation and result in poorer or no acceleration.

The present invention with amalgamated coarse cells retains the grid properties of the underlying fine cells to calculate the pore volume, compressibility, and flow terms. There is no upscaling involved. Thus, the simulation result is exactly or nearly exactly the same as the original simulation model without acceleration. However the accelerated model is performed in simulators running much faster. The present invention achieves model speedup without affecting the results. Simulation users can apply model updating and field prediction just as done conventionally. There is no additional work effort required to realize the improved simulation performance.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A machine to simulate reservoir production measures of a subsurface reservoir having a hydrocarbon regions and a peripheral aquifer region, the reservoir being defined by a plurality of grid cells designated organized as hydrocarbon grid cells for the hydrocarbon region of the reservoir and aquifer grid cells for the peripheral aquifer region, the plurality of grids cells being partitioned into a plurality of processing sub-domains, each processing sub-domain containing at least a portion of the plurality of grid cells, the machine comprising:
  a memory storing computer operable instructions causing the machine to simulate reservoir production measures of the subsurface reservoir;
  a plurality of processor nodes having one or more processors, the plurality of processor nodes being under control of the stored computer operable instructions and being assigned to a processing sub-domain, and comprising:
  a parallel input processing grid sub-domain, the processor nodes in the parallel input processing domain under control of the stored computer operable instructions organizing the grid cells of the reservoir into input blocks of cell data for processing;
  an unstructured graph and connection factor sub-domain, the processor nodes in the unstructured graph and connection factor sub-domain under control of the stored computer operable instructions forming cell geometries for amalgamating aquifer grid cells and defining active grid cells composed of the hydrocarbon grid cells, forming a load-balanced processing network;
  the processor nodes in the unstructured graph and connection factor sub-domain further performing under control of the stored computer operable instructions the steps of:
  (a) determining the presence of vertical columns of cells of the aquifer region;
  (b) grouping the vertical columns of cells of the aquifer region into connected grid blocks of amalgamated aquifer cells;
  (c) performing load balanced domain partitioning of the cells of the hydrocarbon region and the amalgamated aquifer cells of the aquifer region; and
  (d) generating transmissibilities between the cells of the amalgamated aquifer cells of the aquifer region; and
  a simulation processing sub-domain for performing reservoir simulation of the active grid cells.

2. The machine of claim 1, wherein the processor nodes in the simulation processing sub-domain for performing reservoir simulation of the active grid cells perform under control of the stored computer operable instructions the steps of:
  (a) performing the reservoir simulation of the cells of the hydrocarbon region and the aquifer region to determine reservoir production measures within the grid cells of the cells of the hydrocarbon region and the aquifer region;
  (b) determining pore volumes and porosities of the amalgamated aquifer cells based on the determined pressures determined during the reservoir simulation;
  (c) determining if convergence has occurred for the reservoir simulation, and, if so, populating the cells of the aquifer region within the amalgamated aquifer cells with the determined pressures and pore volumes for the aquifer cells; and, if not,
  (d) updating simulation parameters and returning to the step of performing the reservoir simulation.

3. In a computerized reservoir simulation of a subsurface reservoir having a hydrocarbon region and an aquifer region peripheral to the hydrocarbon region, the computerized reservoir simulation being performed in a data processing system having a memory and plurality of computer nodes, each comprising a plurality of computer cores operating in parallel, the reservoir being defined by a reservoir model composed of a plurality of grid cells, a computer implemented method of simulating reservoir production measures in the cells of the reservoir model, comprising the steps of:
  storing in the memory computer operable instructions causing the computer cores operating in parallel to perform the reservoir simulation of the subsurface reservoir;
  performing in the computer cores operating in parallel, under control of the stored computer operable instructions, steps of reservoir simulation of the subsurface reservoir comprising:
  (a) determining the presence of vertical columns of cells of the aquifer region;
  (b) grouping the vertical columns of cells of the aquifer region into connected grid blocks of amalgamated aquifer cells;
  (c) performing load balanced domain partitioning of the cells of the hydrocarbon region and the amalgamated aquifer cells of the aquifer region;
  (d) generating transmissibilities between the cells of the amalgamated aquifer cells of the aquifer region;
  (e) performing the reservoir simulation of the cells of the hydrocarbon region and the aquifer region to determine reservoir production measures within the grid cells of the cells of the hydrocarbon region;
  (f) determining pore volumes and porosities of the amalgamated aquifer cells based on the determined pressures determined during the reservoir simulation;
  (g) determining if convergence has occurred for the reservoir simulation, and, if so, populating the cells of the aquifer region within the amalgamated aquifer cells with the determined pressures and pore volumes for the aquifer cells; and, if not,
  (h) updating simulation parameters and returning to the step of performing the reservoir simulation.

4. A data processing system for computerized reservoir simulation of a subsurface reservoir having a hydrocarbon region and an aquifer region peripheral to the hydrocarbon region, the reservoir being defined by a reservoir model composed of a plurality of grid cells, the data processing system comprising:
  a memory storing computer operable instructions causing the data processing system to perform the computerized reservoir simulation of the subsurface reservoir;

a processor having plurality of computer nodes under control of the computer operable instructions stored in the memory, each computer node comprising a plurality of computer cores operating in parallel and performing the steps of:
  (a) determining the presence of vertical columns of cells of the aquifer region;
  (b) grouping the vertical columns of cells of the aquifer region into connected grid blocks of amalgamated aquifer cells;
  (c) performing load balanced domain partitioning of the cells of the hydrocarbon region and the amalgamated aquifer cells of the aquifer region;
  (d) generating transmissibilities between the cells of the amalgamated aquifer cells of the aquifer region;
  (e) performing the reservoir simulation of the cells of the hydrocarbon region and the aquifer region to determine reservoir production measures within the grid cells of the cells of the hydrocarbon region;
  (f) determining pore volumes and porosities of the amalgamated aquifer cells based on the determined pressures determined during the reservoir simulation;
  (g) determining if convergence has occurred for the reservoir simulation, and, if so, populating the cells of the aquifer region within the amalgamated aquifer cells with the determined pressures and pore volumes for the aquifer cells; and, if not,
  (h) updating simulation parameters and returning to the step of performing the reservoir simulation; and
a memory for storing the simulated reservoir production measures in the cells of the reservoir model; and
a display for displaying the stored the simulated reservoir production measures in the cells of the reservoir model.

5. A data storage device having stored in a non-transitory computer readable medium computer operable instructions for causing a data processing system to perform computerized reservoir simulation of a subsurface reservoir having a hydrocarbon region and an aquifer region peripheral to the hydrocarbon region, the data processing system having a memory and a plurality of computer nodes, each comprising a plurality of computer cores operating in parallel, the reservoir being defined by a reservoir model composed of a plurality of grid cells, the instructions stored in the data storage device causing the data processing system to perform a computer implemented method of simulating reservoir production measures in the cells of the reservoir, comprising the following steps:
  storing in the memory computer operable instructions causing the computer cores operating in parallel to perform the reservoir simulation of a subsurface reservoir;
  performing in the computer cores operating in parallel, under control of the stored computer operable instructions, steps to perform computerized reservoir simulation of a subsurface reservoir, comprising:
  (a) determining the presence of vertical columns of cells of the aquifer region;
  (b) grouping the vertical columns of cells of the aquifer region into connected grid blocks of amalgamated aquifer cells;
  (c) performing load balanced domain partitioning of the cells of the hydrocarbon region and the amalgamated aquifer cells of the aquifer region;
  (d) generating transmissibilities between the cells of the amalgamated aquifer cells of the aquifer region;
  (e) performing the reservoir simulation of the cells of the hydrocarbon region to determine pressures within the grid cells of the cells of the hydrocarbon region;
  (f) determining pore volumes and porosities of the amalgamated aquifer cells based on the determined pressures determined during the reservoir simulation;
  (g) determining if convergence has occurred for the reservoir simulation, and, if so, populating the amalgamated aquifer cells with the determined pressures and pore volumes for the aquifer cells; and, if not,
  (h) adjusting simulation parameters and returning to the step of performing the reservoir simulation.

* * * * *